United States Patent
Chang et al.

(10) Patent No.: US 12,327,298 B2
(45) Date of Patent: Jun. 10, 2025

(54) TRANSLATION OF IMAGES OF STAINED BIOLOGICAL MATERIAL

(71) Applicant: OREGON HEALTH & SCIENCE UNIVERSITY, Portland, OR (US)

(72) Inventors: Young Hwan Chang, Portland, OR (US); Erik Burlingame, Portland, OR (US); Geoffrey Schau, Portland, OR (US); Joe W. Gray, Lake Oswego, OR (US)

(73) Assignee: OREGON HEALTH & SCIENCE UNIVERSITY, Portland, OR (US)

(*) Notice: Subject to any disclaimer, the term of this patent is extended or adjusted under 35 U.S.C. 154(b) by 883 days.

(21) Appl. No.: 17/419,693

(22) PCT Filed: Dec. 30, 2019

(86) PCT No.: PCT/US2019/069000
§ 371 (c)(1),
(2) Date: Jun. 29, 2021

(87) PCT Pub. No.: WO2020/142461
PCT Pub. Date: Jul. 9, 2020

(65) Prior Publication Data
US 2022/0058839 A1    Feb. 24, 2022

Related U.S. Application Data

(60) Provisional application No. 62/885,777, filed on Aug. 12, 2019, provisional application No. 62/787,088, filed on Dec. 31, 2018.

(51) Int. Cl.
G06T 11/00    (2006.01)
G06N 3/045    (2023.01)
(Continued)

(52) U.S. Cl.
CPC .............. *G06T 11/00* (2013.01); *G06N 3/045* (2023.01); *G06N 3/047* (2023.01); *G06N 3/088* (2013.01);
(Continued)

(58) Field of Classification Search
CPC . G06T 11/00; G06T 7/32; G06T 2207/20081; G06T 2207/20084;
(Continued)

(56) References Cited

U.S. PATENT DOCUMENTS

2009/0245598 A1* 10/2009 Can ................... G06T 7/0012
382/128
2017/0103521 A1* 4/2017 Chukka ................ G06V 20/695
(Continued)

FOREIGN PATENT DOCUMENTS

WO    WO2018155898        8/2018
WO    WO-2018155898 A1 *  8/2018 ............. G06N 20/00
WO    WO2018229052       12/2018

OTHER PUBLICATIONS

PCT Search Report & Written Opinion for Application No. PCT/US19/69000, mailed on Mar. 31, 2020, 10 pgs.
(Continued)

*Primary Examiner* — Khai M Nguyen
(74) *Attorney, Agent, or Firm* — Lee & Hayes P.C.; Tanya M. Harding; Katherine M. Mead

(57) ABSTRACT

Techniques and systems for translating images of biological samples stained according to a first staining technique into images representing the biological samples stained according to a second staining technique. In various implementations, the first staining technique can include a histopathological staining technique and the second staining technique can include an immunofluorescence staining technique or an immunohistochemistry staining technique.

16 Claims, 12 Drawing Sheets

(51) Int. Cl.
*G06N 3/047* (2023.01)
*G06N 3/088* (2023.01)
*G06T 7/32* (2017.01)

(52) U.S. Cl.
CPC ...... *G06T 7/32* (2017.01); *G06T 2207/20081* (2013.01); *G06T 2207/20084* (2013.01); *G06T 2207/30024* (2013.01); *G06T 2210/41* (2013.01)

(58) Field of Classification Search
CPC ....... G06T 2207/30024; G06T 2210/41; G06T 382/128; G06N 3/047; G06N 3/045; G06N 3/088
See application file for complete search history.

(56) References Cited

U.S. PATENT DOCUMENTS

2017/0276598 A1* 9/2017 Ikuyama ............ G01N 21/6458
2019/0042826 A1* 2/2019 Chang ...................... G06T 7/11
2020/0219256 A1* 7/2020 Barnes ...................... G06T 7/11

OTHER PUBLICATIONS

Barak, et al., "Clinical Utility of Cytokeratins as Tumor Markers," Clinical Biochemistry, vol. 37, Issue 7, Jul. 2004, pp. 529-540.
Bay, et al., "SURF: Speeded Up Robust Features," Computer Vision—ECCV (European Conference on Computer Vision) 2006, vol. 3951, May 2006, pp. 404-417.
Chang, et al., "Deep Learning-Based Nucleus Classification in Pancreas Histological Images," 2017 39th Annual International Conference of the IEEE Engineering in Medicine and Biology Society (EMBC), Jul. 2017, pp. 672-675.
Christiansen, et al., "In Silico Labeling: Predicting Fluorescent Labels in Unlabeled Images," Cell, vol. 173, Issue 3, Apr. 2018, pp. 792-803, e1-e11, Supplemental Figures (32 pages).
Codella, et al., "Deep Learning Ensembles for Melanoma Recognition in Dermoscopy Images," IBM Journal of Research and Development, arXiv:1610.04662v2, vol. 61, No. 4/5, Jul./Sep. 2017, 28 pages.
Hegde, et al., "Similar Image Search for Histopathology: SMILY," npj | Digital Medicine, 2, 56, Jun. 2019, pp. 1-9.
Isola, et al., "Image-to-Image Translation with Conditional Adversarial Networks," ArXiv:1611.07004 Cs, Nov. 2016, 16 pages.
Kingma, et al., "Auto-Encoding Variational Bayes," ArXiv:1312.6114 Cs Stat, Dec. 2013, 9 pages.
Macenko, et al., "A Method for Normalizing Histology Slides for Quantitative Analysis," Proceedings—2009 IEEE International Symposium on Biomedical Imaging: From Nano to Macro, Jun. 2009, pp. 1107-1110.
Matthews, "Comparison of the Predicted and Observed Secondary Structure of T4 Phage Lysozyme," Biochimica et Biophysica Acta (BBA)—Protein Structure, vol. 405, Issue 2, Oct. 1975, pp. 442-451.
Ounkomol, et al., "Label-Free Prediction of Three-Dimensional Fluorescence Images from Transmitted-Light Microscopy," Nature Methods, Nov. 2018, pp. 917-920 (13 pages).
Pan, et al., "Finding Representative Set from Massive Data," Fifth IEEE International Conference on Data Mining (ICDM'05), Nov. 2005, pp. 338-345.
Ronneberger, et al., "U-Net: Convolutional Networks for Biomedical Image Segmentation," ArXiv 150504597 Cs, May 2015, 8 pages.
Wang, et al., "Image Quality Assessment: From Error Visibility to Structural Similarity," IEEE Transactions on Image Processing, vol. 13, No. 4, Apr. 2004, 14 pages.

* cited by examiner

300 ⟶

┌─────────────────────────────────────────────────────────────┐
│ OBTAIN DATA OF A FIRST IMAGE OF A SAMPLE OF BIOLOGICAL MATERIAL │
│ THAT IS STAINED ACCORDING TO A FIRST STAINING TECHNIQUE     │
│ 302                                                         │
└─────────────────────────────────────────────────────────────┘
                              │
                              ▼
┌─────────────────────────────────────────────────────────────┐
│ GENERATE, BASED ON THE DATA OF THE FIRST IMAGE, A SECOND IMAGE │
│ OF THE SAMPLE OF THE BIOLOGICAL MATERIAL THAT REPRESENTS THE │
│ SAMPLE OF BIOLOGICAL MATERIAL STAINED ACCORDING TO A SECOND │
│ STAINING TECHNIQUE                                          │
│ 304                                                         │
└─────────────────────────────────────────────────────────────┘

FIG. 3

TRANSLATION OF IMAGES OF STAINED BIOLOGICAL MATERIAL

CROSS-REFERENCE TO RELATED APPLICATIONS

This is the U.S. National Phase of International Patent Application No. PCT/US19/69000, filed Dec. 30, 2019, which claims priority to and the benefit of the earlier filing date of U.S. Provisional Application No. 62/787,088, filed on Dec. 31, 2018, and U.S. Provisional Application 62/885,777, filed on Aug. 12, 2019, each of which is incorporated by reference herein in its entirety.

STATEMENT REGARDING FEDERALLY SPONSORED RESEARCH OR DEVELOPMENT

This invention was made with government support under U54 CA209988 and CA233280 awarded by the National Institutes of Health. The government has certain rights in the invention.

TECHNICAL FIELD

This disclosure relates generally to estimating images of biological samples stained with a first technique by applying a deep learning model to images of the biological sample stained with a second technique, as well as various techniques for training the deep learning model.

BACKGROUND

The clinical management of many systemic diseases, including cancer, is informed by histopathological evaluation of biopsy tissue, wherein thin sections of the biopsy are processed to visualize tissue and cell morphologies for signs of disease. Physicians depend on histopathology—the visualization and pathological interpretation of tissue biopsies—to diagnose cancer. Hematoxylin and eosin (H&E)-stained histologic sections (e.g., 3 µm-thick formalin-fixed paraffin-embedded tissue biopsies) are the standard of care routinely employed by pathologists to make diagnoses. Though H&E remains the gold standard stain in such evaluations for many cancer types, in challenging cases with indeterminate histology, or tumor differentiation, antibody labeling of tumor cells by a molecular imaging technique like immunofluorescence (IF) and/or immunohistochemistry (IHC) provides further characterization.

Staining by IF or IHC can augment pathologist interpretation, as it allows for specific targeting and visualization of clinically relevant biomolecules and cell subtypes. Moreover, the recent development of multiplexed imaging such as cyclF (Lin, et al., Nature Communications 6, 8390 (2015); Gerdes, et al., PNAS 110(29), 11982-11987 (2013)), multiplexed IHC (mIHC); Tsujikawa, et al., Cell Reports 19(1), 203-217 (2017)), and other multiplex methods in histopathology (Zrazhevskiy, et al., Nature Protocols 8(10), 1852 (2013); Angelo, et al., Nature Medicine 20(4), 436-442 (2014); Giesen, et al., Nature Methods 11(4), 417-422 (2014)), have greatly expanded the palette with which pathologists can visualize individual tissue sections. This allows for deep in situ assessment of the complexities of the tumor microenvironment, e.g. through examination of the spatial interactions and architectural organization of tumor and non-tumor cells.

It is becoming increasingly apparent that determining the spatially-resolved molecular profile of a cancer is important for disease subtyping and choosing a patient's course of treatment (Duraiyan et al., J. Pharm. Bioallied Sci. 4, 2012). Despite its clinical value, IF is time- and resource-intensive and can involve the use of expensive reagents and hardware, so assessment can be limited to a small representative section of a tumor, which may not be fully representative of the neoplasm, which can be the case in areas of squamous differentiation in an adenocarcinoma (Hester et al., J. Surg. Oncol. 118, 2018). Also, the cost associated with IF may in some cases may limit its use to within highly-developed clinical laboratories, further widening the quality-of-care gap between high- and low-income communities.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 3 is a flow diagram of a process to translate images of biological material that have been stained according to an initial technique into additional images representing the biological material stained according to additional techniques.

FIG. 8A illustrates an example architecture of generator network G which is based on the U-net architecture (Ronneberger et al., ARXIV150504597 Cs, 2015). FIG. 8B illustrates an example architecture of discriminator network D.

DETAILED DESCRIPTION

Figure 1:
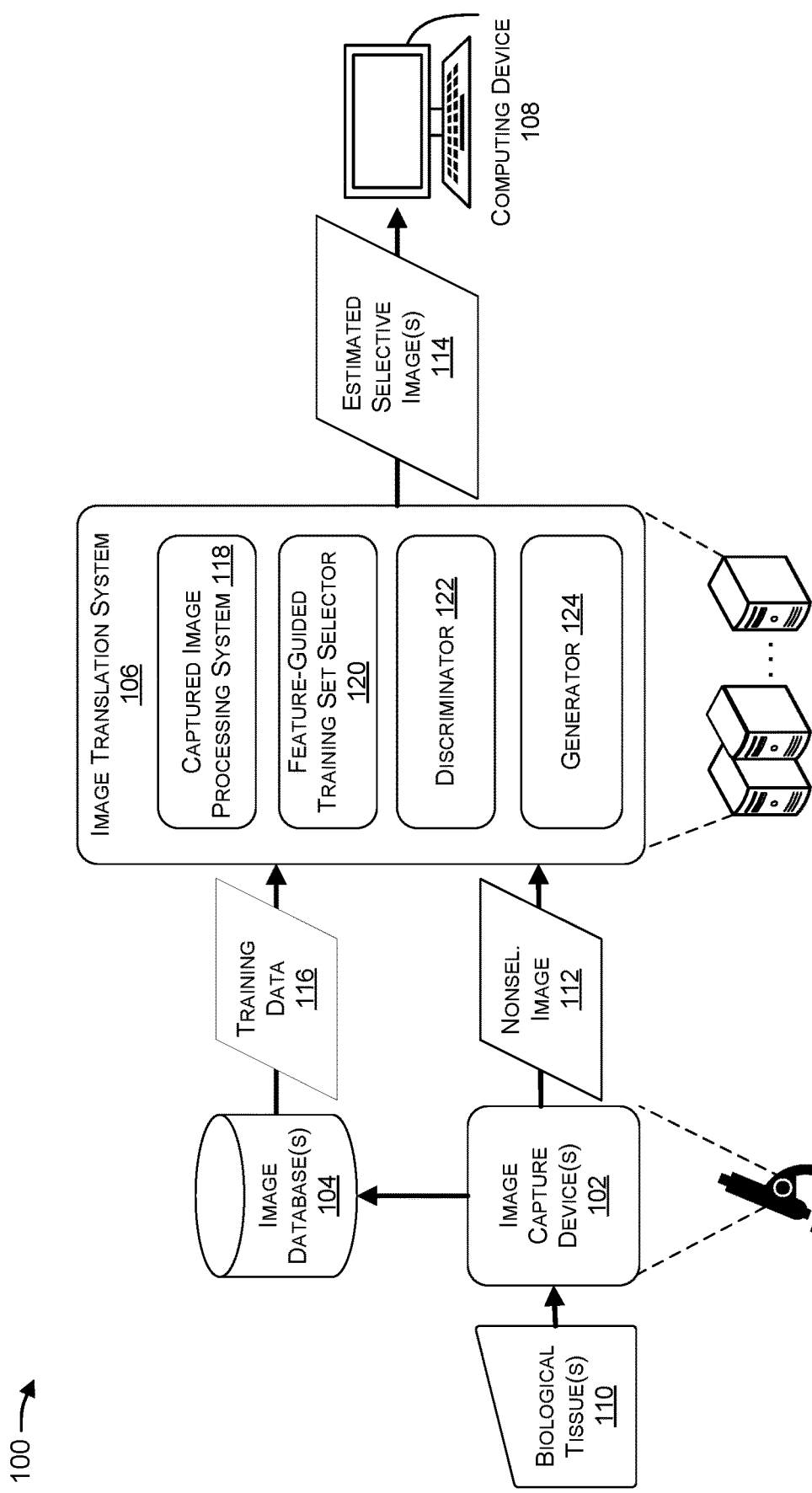
FIG. 1 is a diagram of an example environment to generate images of biological material that represent a technique for staining the biological material that is different from an initial technique used to stain the biological material.

Techniques and systems for generating translated images of biological material are described herein. In particular, data from images of biological material that have been stained according to a first staining technique can be used to generate images that represent the biological material stained according to one or more additional staining techniques. In various implementations, models can be generated that can utilize the data from the images of the biological material that are stained according to an initial staining technique in order generate images of the same biological material stained according to at least one additional staining technique.

Physicians often depend on pathological interpretation of biological tissue as useful diagnostic and prognostic indicators of patient conditions. Imaging tissue is useful because it provides a representational view of normal and malignant tissue types, allowing clinicians to identify and characterize patterns of cellular growth associated with disease state. Selective, antigen-based imaging (e.g., IF and/or IHC imaging) and/or nuclear stains like 4',6-diamidino-2-phenylindole (DAPI) can be used to measure the spatial distribution of critically-important biomarkers within a tissue section. By tagging biomarker antigens of interest with antibodies attached to fluorescent markers, selective, antigen-based imaging provides clear pictures of where the biomarkers lie within patient tissue. Although clinically valuable, selective imaging is expensive, time-consuming, and requires specialized technical expertise to operate effectively. Because of these factors, access to IF imaging is limited, and generally unavailable to many underserved communities, particularly in the developing world. Nonselective stain imaging (e.g., H&E stain imaging, periodic acid-Schiff (PAS) stain imaging, or the like) of tissue sections is much more common and widely used as a routine diagnostic measurement available even in underserved communities.

In various implementations described herein, computer-based models can be used to generate an accurate estimation of a selective, antigen-based histological image of a tissue sample based on a nonselective histological image of the tissue sample. For example, a model can convert an H&E image of a sample into an estimation of a corresponding IF image of the sample. Accordingly, the diagnostic benefits of selective, antigen-based histological imaging can be achieved quickly, at a reduced cost, and without specialized technical expertise.

Various example systems and techniques described herein utilize deep learning (DL) models that identify the complex relationships between cells viewed with H&E staining and cells viewed by selective staining IF. The DL models can generate estimations of IF images given one or more sections of H&E stained tissue(s) without performing IF. In particular, various example systems and techniques described herein are capable of generating realistic tumor marker IF whole slide images (WSIs) conditioned on corresponding H&E-stained WSIs with up to 94.5% accuracy in a matter of seconds. Thus, various implementations described herein have the potential to not only improve our understanding of the mapping of histological and morphological profiles into protein expression profiles, but also greatly increase the efficiency of diagnostic and prognostic decision-making.

As disclosed herein, a DL-based method called speedy histological-to-IF translation (SHIFT) takes histologic images of routine H&E stained tissue as input, then in near-real time, can return inferred virtual IF images that accurately depict the underlying distribution of immunophenotypes without requiring immunostaining of the tissue being tested. As shown herein, DL-extracted feature representations of histological images can guide representative sample selection, which improves SHIFT generalizability. SHIFT can serve as an efficient preliminary, auxiliary, or substitute for IF by delivering multiplexed virtual IF images for a fraction of the cost and in a fraction of the time required by nascent multiplexed imaging technologies. Accordingly, various implementations described herein provide significant improvements to the technological field of histopathology.

Various examples described herein relate to training one or more DL-based models to generate images representing a biological sample stained according to a first technique (e.g., IF) based on images of the biological sample stained according to a second technique (e.g., H&E). The DL-based models can be trained based on a training set including images from a variety of biological samples obtained at least one subject (e.g., at least one human subject). In addition, images in the training set may be selected according to a feature-guided technique described herein. According to various implementations described herein, various techniques for training DL-based models, utilizing DL-based models to estimate images, and/or selecting samples to obtain training sets for DL-based models cannot practically be performed in the human mind, and are therefore fundamentally tied to computer technology.

These and various other example features will be apparent from a reading of the following description and a review of the associated drawings. However, the claimed subject matter is not limited to implementations that solve any or all disadvantages or provide any of the benefits noted in any part of this disclosure.

FIG. 1 is a diagram of an example environment 100 to generate estimated selective, antigen-based stained images of biological material based on nonselective stained images of the biological material using a SHIFT model. As illustrated, the environment 100 includes at least one image capture devices 102, at least one image database 104, an image translation system 106, and a computing device 108.

In various implementations, the image capture device(s) 102 are configured to capture images of one or more biological tissues 110 stained according to one or more techniques. As used herein, the term "image" can refer to a plurality of pixels arranged in at least two dimensions and representing a visual depiction of a scene, such as a visual depiction of a stained tissue sample. In some examples, the image capture device(s) 102 include at least one of a microscope, a fluorescence microscope, or a camera (e.g., a digital camera). In various implementations, the biological tissue(s) 110 are obtained from at least one subject and prepared according to at least one of a nonselective staining technique (e.g., a histological staining technique) or a selective staining technique. As used herein, the terms "nonselective staining technique," "nonselective technique," and their equivalents can refer to a technique in which a non-antibody molecular stain is used to attach to parts of a biological tissue sample. Histological staining techniques (e.g., H&E) and nonselective fluorescent stains (e.g., DAPI) are examples of nonselective staining techniques. As used herein, the terms "selective staining technique," "selective technique," and their equivalents, can refer to a technique in which a stain is attached to an antibody that is configured to attach to a targeted antigen. IHC staining techniques, IF staining techniques, and the like, are examples of selective staining techniques. For example, a selective staining technique can include at least one of a pan-cytokeratin (pan-CK) staining technique, an α-smooth muscle actin (α-SMA) staining technique, or a Ki-67 staining technique. As used herein, the terms "selectively stained image," "selective stain image," "selective image," and their equivalents can refer to an image of a biological tissue stained according to a selective staining technique. Techniques for staining biological material can utilize stains or dyes to enhance the appearance of certain structural features in the biological material. For example, staining biological material can enhance the appearance of nuclei, cytoplasm, DNA, nucleic acids, or other parts of the cells included in the biological material. According to various implementations, the biological tissue(s) 110 include at least one biopsy. In some cases, the biological tissue(s) 110 include formalin-fixed paraffin-embedded tissue blocks that have been cut into sections. In some cases, the sections are baked and deparaffinized and subjected to antigen retrieval processing, washing, and blocking. In various examples, the biological tissue(s) 110 are exposed to at least one nonselective stain (e.g., H&E or DAPI) and/or at least one selective stain (e.g., at least one IF stain and/or at least one IHC stain). For instance, the image capture device(s) 102 capture images of at least some of the biological tissue(s) 110 stained according to an mIHC staining technique.

According to some implementations, a single sample of the biological tissue(s) 110 is stained according to both a selective stain and a nonselective stain. For example, the sample can be stained according to at least one selective stain, an image can be captured of the sample stained with the selective stain(s), then the sample can be stained according to at least one nonselective stain, and an image can be captured of the sample stained with the nonselective stain(s). Accordingly, in these implementations, the image capture device(s) 102 can capture of an image of the same sample stained according to a selective technique and an image of the sample stained according to a nonselective staining technique.

In various cases, the image database(s) 104 store images of at least some of the biological tissue(s) 110 stained according to various techniques. In some implementations, the image database(s) 104 stores multiple images of the same sample stained according to different techniques. For example, the image database(s) 104 stores a nonselective image and at least one selective image of each one of multiple samples in the biological tissue(s) 110. In some examples, the image database(s) 104 can be integrated into the image capture device(s) 102 and/or part of a computing device that is separate from the image capture device(s) 102.

According to various implementations, the image translation system 106 is configured to translate a nonselective image 112 of a first sample in the biological tissue(s) 110 into an estimated selective image 114 of the first sample. Further, in various examples, the image translation system 106 is configured to learn how to translate the nonselective image 112 into the estimated selective image 114 by processing training data 116. The training data 116, for instance, includes nonselective images and selective images of second samples in the biological tissue(s) 110.

The image translation system 106 can be implemented by one or more computing devices. In various examples, the computing device(s) can be included in a single computing device and/or a cloud computing architecture that operates the computing device(s) on behalf of an organization that implements the image translation system 106. In these scenarios, the cloud computing architecture can instantiate one or more virtual machine instances on behalf of the organization implementing the image translation system 106 using the computing device(s). The cloud computing architecture can be located remote from a location of the organization implementing the image translation system 106. In additional examples, the computing device(s) can be under the direct control of an organization (e.g., a hospital, clinic, or the like) implementing the image translation system 106. For example, the organization implementing the image translation system 106 can maintain the computing device(s) to perform operations related to translating images of biological material stained according to one or more initial techniques into estimated images of the biological material stained according to different techniques. In various implementations, the computing device(s) can include at least one of a server, a desktop computer, a laptop computer, a tablet computer, a mobile device, or the like. In some examples, the image translation system 106 includes the image capture device(s) 102, the image database(s) 104, and/or the computing device 108.

The image translation system 106 can include a captured image data processing system 118 that obtains data representing images of the biological tissue(s) 110. The images of the biological tissue(s) 110 can be obtained by the image capture device(s) 102. For instance, the captured image processing system 118 receives and/or accesses the images from the image database(s) 104 and/or the image capture device(s) 102. The capture image processing system 118, for example, performs image preprocessing on the nonselective image 112 and/or the images in the training data 116. This preprocessing can enhance the accuracy of the estimated selective image 114. In some cases, the preprocessing includes at least one of aligning the images, downscaling the images, registering the images (e.g., using SURF features described in Bay et al., COMPUTER VISION—ECCV 2006, 2006; Chang et al., 2017 39TH ANNUAL INTERNATIONAL CONFERENCE OF THE IEEE ENGINEERING IN MEDICINE AND BIOLOGY SOCIETY (EMBC), 2017), reducing technical noise in the images, normalizing intensity of pixels in the images, tiling the images to generate image tiles (e.g., subdividing each image into non-overlapping sections, which can be referred to herein as "tiles"), or discarding one or more images and/or image tiles according to a predetermined rule (e.g., discarding any images and/or image tiles that contain more than a threshold of background). Aligning the images, for example, can include spatially aligning a nonselective image of a particular sample with a selective image of the particular sample, such that the aligned nonselective and selective images have a common coordinate system. For example, a position in the sample may be defined according pixels with the same x-y coordinates in the aligned nonselective image and the aligned selective image. The images can be aligned, for example, by processing the images to identify common structures (e.g., nuclei) depicted in the nonselective image and the selective image, and shifting the nonselective image and/or the selective image in order to ensure that both images are aligned with each other.

According to some implementations, the image translation system 106 includes a feature-guided training set selector 120 that identifies one or more samples whose images are to be included in the training data 116. The feature-guided training set selector 120 can select a minimal number of samples that maximally represent the full dataset of samples. For example, the training data 116 may be obtained to include nonselective and selective images of one or more samples in the biological tissue(s) 110. However, due to the expense and/or resources to obtain the selective images, only a subset of the total number of samples in the biological tissue(s) 102 may be stained according to a selective technique in a limited resource setting, such that only a limited number of selective images can be included in the training data 116. In various cases, the feature-guided training set selector 120 is configured to select one or more samples in the biological tissue(s) 110 for selective imaging. In some examples, the feature guided training set selector 120 identifies feature distributions of images and/or tiles depicting various samples stained according to a nonselective technique (e.g., H&E), which may use fewer resources and/or cost less than the selective technique. The feature guided training set selector 120 may identify, among the samples, one or more of the samples whose nonselective images represent the broadest, most complete feature distributions.

For example, the feature-guided training set selector 120 includes a variational autoencoder (VAE) model that extracts multi-dimensional feature vectors (e.g., based on morphological features) from the images and/or image tiles of samples stained according to the nonselective technique. A VAE model (described, e.g., in Kingma and Wellington, ARXIV13126114 CS STAT, 2013) is designed to elucidate salient features of data in a data-driven and unsupervised manner. A VAE model seeks to train a pair of complementary convolutional neural networks: an encoder network θ that seeks to model an input $x_i$ as a hidden latent representation $z_i$, and a decoder network ϕ that seeks to reconstitute $x_i$ from its latent representation $z_i$. The latent representation can be in the form of a feature vector that represents multiple dimensions. The VAE cost function shown below penalizes model training with an additional Kullback-Leibler (KL) divergence term that works to conform the distribution of z with respect to a given prior, which, in this case, is the standard normal distribution defined in Formula 1:

$$\mathcal{L}_i(x_i,\theta,\varphi) = -\mathbb{E}_{z\sim q_\theta(z|x_i)}[\log p_\varphi(x_i|z)] + KL(q_\theta(z|x_i)\|p(z))$$

Formula 1:

where $p(z) = \mathcal{N}(0,1)$.

By specifying a latent dimension z less than the input dimension of x, a VAE model learns a pair of optimal encoding and decoding functions that enable reconstruction of an input sample subject to capacity constraints of the latent feature space within the model. In general, this formulation learns encoding functions that compress the information content in the high-dimensional input into a low-dimensional embedding space that learns dataset features sufficient to reconstitute the original input sample while preserving an expected distribution over the learned features. Accordingly, a vector representing the features of each individual nonselective image and/or tile can be generated. The vectors generated from the full dataset of nonselective images can be compared by the feature-guided training set selector 120. This interpretation enables the feature-guided training set selector 120 to identify a set of nonselective images of a minimal number of samples that maximally cover the entire learned feature space. Once the samples are selected by the feature-guided training set selector 120, the selective images of the selected samples can be obtained. For example, the selected samples can be stained according to a selective staining technique and selective images of the selected samples can be obtained using the image capture device(s) 102. The nonselective and selective images of the selected samples can be used to train a deep learning (DL) model to estimate selective images of other tissue samples based on nonselective input images of the tissue samples. As used herein, the terms "estimated image," "virtual image," and their equivalents can refer to a DL model-generated image representing a biological tissue stained according to one or more staining techniques and may not refer to a ground truth image of the biological tissue stained according to the one or more staining techniques. In some situations, an image of a sample of the biological tissue(s) 110 captured by the image capture device(s) 102 can be referred to as a "ground truth" image.

In various implementations, the DL model utilized by the image translation system 106 includes conditional generative adversarial networks (cGANs) configured to generate the estimated selective image 114. In various cases, the DL model can be referred to as a "SHIFT" model. For example, the image translation system 106 can utilize the bipartite, cGAN-driven technique pix2pix (Isola, et al.) to learn how to and to perform translation of the nonselective image 112 into the estimated selective image 114. The cGANs are represented, in FIG. 1, by a discriminator 122 and a generator 124. The generator 124 includes a model (e.g., a convolutional neural network (CNN)) that is trained and/or generated using at least a portion of the training data 116 in order to translate nonselective images (e.g., the nonselective image 112) into corresponding estimated selective images (e.g., the estimated selective image 114). Various parameters of the model are optimized to accurately represent conversions of the at least one nonselective image (e.g., at least one H&E image) in the training data 116 into its corresponding selective image(s) in the training data 116. According to some examples, the images for the training data can be selected according to the feature-guided training set selector 120.

In various examples, the discriminator 122 is configured to predict whether a given image is a ground truth image (e.g., a selective image in the training data 116) or an image generated by the generator 124 (e.g., the estimated selective image 114). The generator 124 is sufficiently trained when it can generate images that fool the discriminator 122 into predicting that images generated by the generator 124 are ground truth images. Once the generator 124 is sufficiently trained, the estimated images generated by the generator 124 may be considered sufficiently realistic to be considered as proxies for true images of selective-stained tissues (see, e.g., Bousmalis, et al., *Unsupervised pixel-level domain adaptation with generative adversarial networks*, in THE IEEE CONFERENCE ON COMPUTER VISION AND PATTERN RECOGNITION (CVPR), (July 2017)). Accordingly, the estimated selective image 114 can be utilized by a clinician (e.g., a pathologist) to evaluate a patient sample for the presence of cancer without performing selective staining on the patient sample.

In various implementations, the discriminator 122 and the generator 124 utilize a pix2pix technique. A cGAN objective of the pix2pix technique is posed as a binary cross-entropy loss, represented by Formula 2:

$$\mathcal{L}_{cGAN}(G,D) = \mathbb{E}_{x,y \sim p_{data}(x,y)}[\log D(x,y)] + \mathbb{E}_{x \sim p_{data}(x)}[\log(1 - D(x, G(x)))]$$ Formula 2:

where the generator 124 ("G") seeks to minimize the objective and thus minimize the distinguishability of generated and ground truth images, while the discriminator 122 ("D") seeks the opposite. In addition to the task of fooling the discriminator 122, the generator 124 is also encouraged to generate images that are faithful to the ground truth through incorporation of an L1 reconstruction loss term, represented by Formula 3:

$$\mathcal{L}_{L1}(G) = \mathbb{E}_{x,y \sim p_{data}(x,y)}[\|y - G(x)\|_1]$$ Formula 3:

The final pix2pix objective is represented by Formula 4:

$$G^* = \arg \min_G \max_D \mathcal{L}_{cGAN}(G, D) + \lambda \mathcal{L}_{L1}(G)$$ Formula 4

In some cases, the regularization parameter A=100 used to address facade generation, semantic labeling, and scene colorization.

In various examples, the model utilized by the generator 124 may be further optimized for translation of images used to identify the presence, amount, and/or morphology of cancer cells. Cancer cells typically remain clustered together, and thus it is challenging to balance the reconstruction loss term (Formula 3) for positive/negative instances according to the stain prevalence for each image in the training data 116. For instance, for low-prevalence (sparse) regions in ground truth images, the generator 124 is more likely to generate an "unstained" pattern rather than generate a sparsely localized stain pattern because the reconstruction loss is relatively small compared to the reconstruction loss for high-prevalence (dense) regions. In order to balance sensitivity and specificity in this context, the model of the generator 124 is receptively tuned to encode sparse staining by being maximally penalized when it makes false classifications on low-prevalence ground truth images during training. For example, the prevalence-based adaptive regularization parameter λ' represented by Formula 5 may be substituted for λ in Formula 4 to enable the generator 124 to more accurately estimate selective images $$\lambda' = \lambda \left( \varepsilon + \frac{1}{n} \sum_{i=1}^{n} I_{\Omega(p_i)} \right)^{-1}$$ Formula 5 where ε=0:1 is chosen to offset in cases where stain prevalence is zero, n is the total number of pixels in the ground truth IF tile and Formula 6 provides:

$$I_{\Omega(p_i)} = \begin{cases} 1, & \text{if } p_i \text{ in } \Omega \\ 0, & \text{otherwise} \end{cases}$$ Formula 6 where Ω represents the ground truth mask, and $p_i$ represents the i-th pixel. Using the prevalence-based adaptive regularization parameter λ' of Formula 5, the objective function is represented by Formula 7:

$$G^* = \arg \min_G \max_D \mathcal{L}_{cGAN}(G, D) + \lambda' \mathcal{L}_{L1}(G)$$ Formula 7

Utilization of the adaptive regularization parameter λ' maximizes the penalty for generator errors on low-prevalence ground truth tiles and minimizes the penalty for errors on high-prevalence ground truth tiles. Accordingly, in some cases, localization characteristics of the discriminator 122 and/or generator 124 can be improved and false classification errors of the discriminator 122 and/or generator 124 can be minimized by using Formula 7.

In various implementations, the image translation system 106 can utilize an ensemble approach to generate the estimated selective image. For example, the image translation system 106 aggregates several trained models can increase prediction accuracy, especially when the aggregated models capture distinct features of their shared input. Thus, the output of independently-trained models, i.e. models utilizing Formulas 4 and 7 (and/or other types of models, such as a model using Label-Free Determination (LFD) (Ounkomol et al., NAT. METHODS 15, 2018)), are used to form an ensemble distribution, under the assumption that the training strategies put forward in the models are complementary. Accordingly, the final output (e.g., the estimated selective image 114) can be smoothed and the performance of the image translation system 106 can be improved by reducing substantial disagreement patterns between models. In some cases, the average of outputs of different models can be used to identify an aggregated output image.

In some cases, the feature-guided training set selector 120 utilizes a sample selection technique to select samples whose images are included in the training data 116. Due to resource constraints, a relatively a small number of paired H&E and IF image samples could be used for model training. Typically, archival WSIs of H&E-stained tissue sections exist on-hand for each sample, which allows for the screening of samples to identify the minimal number of samples that maximally represent the morphological spectrum of the disease being considered. The recent works of Hegde et al. (NPJ DIGIT. MED. 2, 2019) and Otálora et al. (BIORXIV408237, 2018) demonstrate that DL systems are well-suited for image retrieval tasks in digital pathology, wherein a pathologist submits a query image or region of interest and the DL system returns similar images based on their DL-defined feature representations. An approach to address the inverse task of heterogeneous training set selection in digital pathology is disclosed, though this approach could be extended to any data-limited biomedical imaging domain.

To train the discriminator 122 and generator 124 to identify morphologically heterogeneous diseases (e.g., PDAC) using the environment 100, the training data 116 includes a representative set of images. In order to minimize the required resources for acquiring paired nonselective and selective images in the training data 116, a VAE (e.g., Kingma and Welling, ARXIV13126114 CS STAT., 2013) can be used to extract multi-dimensional feature vectors (e.g., 16-dimensional feature vectors) from at least one section (e.g., at least one tile) of each nonselective image in an initial image set to establish comparisons between samples. In various implementations, the feature vectors are clustered, thereby generating feature clusters represents the different samples.

In various examples, to identify the sequence of samples that should be selected, a sample selection technique was adapted (Feng Pan et al., FIFTH IEEE INTERNATIONAL CONFERENCE ON DATA MINING (ICDM'05), IEEE, HOUSTON, TX, USA, 2005) and parameterized using the notation illustrated in the following Table 1:

TABLE 1

Parameters of sample selection technique

| Parameter | Description |
|---|---|
| X | Complete tile set of all samples, $X = \{x_1, x_2, \ldots, x_n\}$ |
| $x_i$ | Single tile, $x_i \in X$ |
| $X_i$ | Subset of X corresponding to the ith sample, $X_i \subset X$ |
| F | Complete VAE-learned feature set, $F = \{f_1, f_2, \ldots, f_m\}$ |
| $f_i$ | Single feature, $f_i \in F$ |
| A | Random variable defined over F |
| T | Random variable defined over X |

The feature-guided training set selector 120 can construct a feature table based on the feature vectors. The table can be two dimensional, such that one dimension (e.g., columns) is arranged according to each section (e.g., each tile) and one direction is arranged according to each feature. In some cases, the feature table is normalized, such that each section is represented as a probability distribution over a domain of features. In various examples, the random variables T and A are defined over a section domain X and a feature domain F, respectively, such that a conditional probability table identifying the probability that a given feature $f_j$ is present in a given section $x_i$ is calculated. A probability distribution can be calculated according to Formula 8:

$$X_i : P(A|X_i) = \frac{1}{|X_i|} \sum_{x \in X_i} P(A|x) \quad \text{Formula 8}$$

To measure the representativeness of sample $X_i$ to the full dataset X, the feature-guided training set selector can calculate the Kullback-Leibler (KL) divergence between $P(A|X_i)$ and $P(A|X)$ according to Formula 9:

$$KL(P(A|X_i)\|P(A|X)) = \sum_{f \in F} P(f|X_i) \log \frac{P(f|X_i)}{P(f|X)} \quad \text{Formula 9}$$

This divergence was then weighted by the proportion of X that $X_i$ includes (|X|/|X|) to prioritize subsets that contribute many tiles to X. The most representative sample is defined according to Formula 10:

$$\hat{X_1} = \min_{X_i \subset X} \left( \frac{|X|}{|X_i|} KL(P(A|X_i)\|P(A|X)) \right) \quad \text{Formula 10}$$

Formula 10 can be expanded to identify a predetermined number of the most representative samples imaged in the initial set of nonselective images. For example, Formula 11 can be used to identify the second most representative sample:

$$\hat{X_2} = \min_{X_i \subset X - \hat{X_1}} \left( \frac{|X|}{|X_i|} KL(P(A|X_i + \hat{X_1})\|P(A|X)) \right) \quad \text{Formula 11}$$

Accordingly, the predetermined number of the most representative samples in the nonselective images in the training data 116 can be identified. The predetermined number may correspond to the maximum number of ground truth selective images that can be obtained, for instance, in a limited resource setting (e.g., with a limited amount of dyes, imaging equipment, personnel availability, or the like). Selective imaging of the most representative samples can be prioritized, such that the training data 116 may be obtained to include nonselective and selective images of the most representative samples identified by the feature-guided training set selector 120. In some cases, the feature-guided training set selector 120 can identify one or more samples represented by the images and/or image tiles that are maximally distributed over a feature space based on the feature vectors of the images and/or image tiles. These identified sample(s) can be selected for selective imaging and selective images of the sample(s) can be included in the training data 116. Accordingly, selective imaging resources (e.g., dyes, efforts of trained individuals that can perform selective staining, specialized imaging equipment, etc.) can be conserved by omitting redundant and/or homogenous samples from the samples imaged for the training data 116. In some cases, the feature-guided training set selector 120 identifies whether the training data 116 includes a sufficient level of feature diversity to adequately train models of the image translation system 106, so that they can accurately generate the estimated selective image 114.

In an illustrative example, the discriminator 122 and the generator 124 are trained according to images of multiple samples in the training data 116. The samples may be part of the biological tissue(s) 110 and may be obtained from one or more subjects. The training data 116 may include a nonselective image (e.g., an H&E image) of each sample and one or more selective images (e.g., at least one of a pan-CK image, an α-SMA stained image, DAPI image, a Ki-67 image, an mIHC image, or a multiplexed IF (mIF) image) of each sample. The generator 124 may include a model trained to translate additional nonselective images into their corresponding selective image(s) using the training data 116 and one or both of the objective functions identified in Formulas 4 and 7. Once trained, the discriminator 122 may be unable to identify that estimated selective images generated by the generator 124 are not ground truth selective images. That is, the discriminator 122 may predict that the estimated selective images generated by the generator 124 (e.g., the estimated selective image(s) 114) are ground truth selective images.

The image capture device(s) 102 may capture the nonselective image 112 from a biopsy among the biological tissue(s) 110. The nonselective image 112 is omitted from the training data 116, in various implementations. In some cases, the nonselective image 112 is captured by the same image capture device that captured at least some of the images in the training data 116. Unlike the samples represented in the training data, the sample represented in the nonselective image 112 is not stained or imaged according to a selective technique. For example, the nonselective image 112 may be obtained in a low-resource clinical setting without access to selective imaging technology.

The image translation system 106 may generate the estimated selective image(s) 114 based on the nonselective image 112. Using the captured image processing system 118 and/or the trained model in the generator 124, the estimated selective image(s) 114 may accurately predict what the sample represented in the nonselective image 112 would look like if imaged according to one or more selective staining techniques. For example, the estimated selective image(s) 114 can provide greater insight into the presence, amount, and/or morphologies of cancer cells in the sample than the nonselective image 112 alone. The estimated selective image(s) may be output on the computing device 108. A clinician, for instance, may utilize the estimated selective image(s) 114 to identify a diagnosis for an individual from which the biopsy represented by the nonselective image 112 is obtained.

Figure 2:
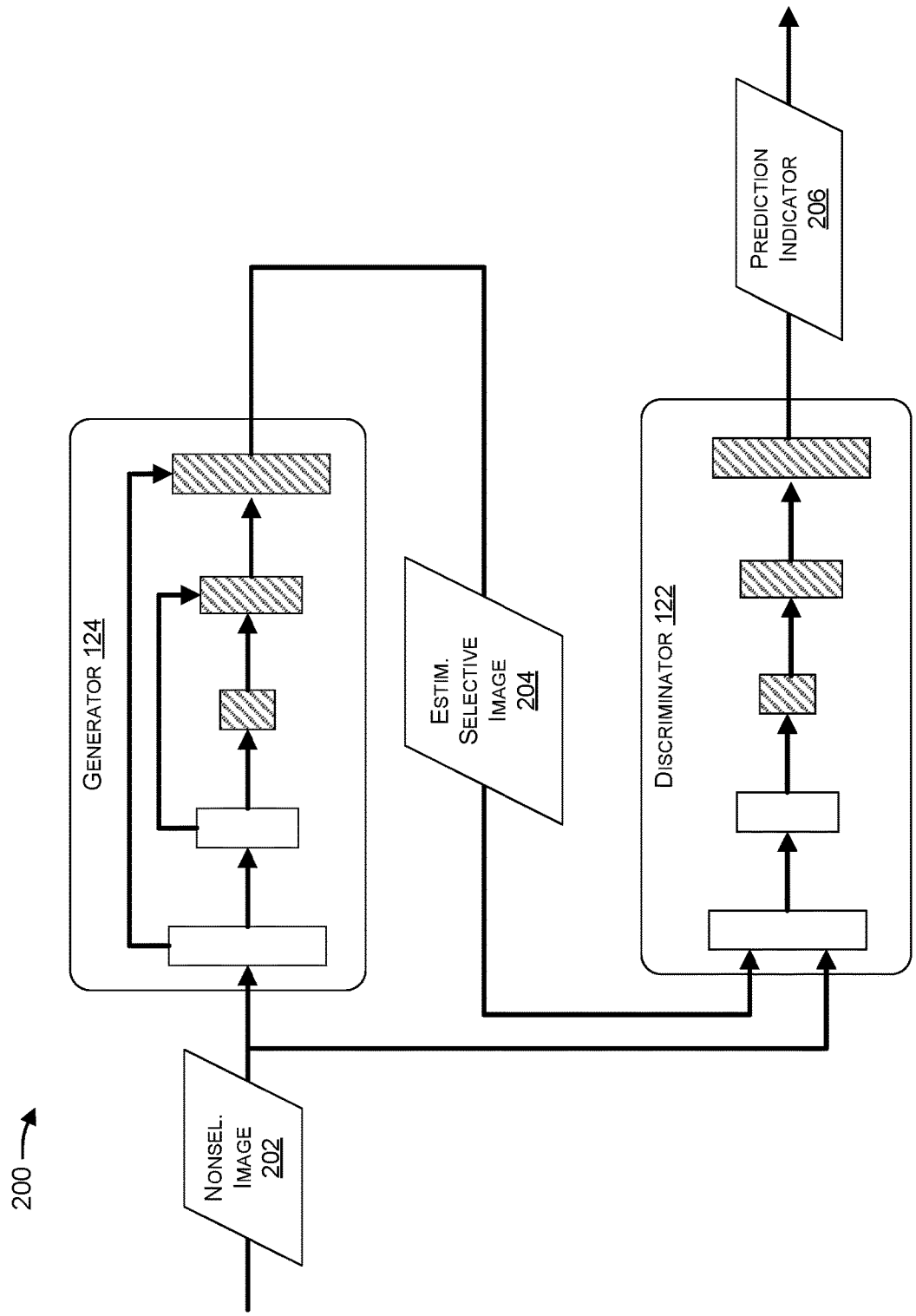
FIG. 2 is a diagram of an example framework to implement a conditional generative adversarial network to generate a model to generate images of biological material that represent at least one technique for staining the biological material that is different from an initial technique used to stain the biological materials.

FIG. 2 illustrates an example environment 200 of cGANs utilized in various implementations of the present disclosure. As illustrated, the environment 200 includes the discriminator 122 and generator 124 described above with reference to FIG. 1. In various implementations, the generator 124 includes a first convolutional neural network (CNN) with a U-Net-like architecture. The first CNN includes multiple blocks arranged in series, including multiple encoder blocks (illustrated as solid blocks) and multiple decoder blocks (illustrated as striped blocks). In various implementations, a ground truth nonselective image 202 is input into one of the encoder blocks, the ground truth nonselective image 202 processed by consecutive blocks in the first CNN, and an estimated selective image 204 is output by one of the decoder blocks. A given decoder block in the first CNN is paired with a corresponding encoder block in the first CNN, such that the decoder block receives the output of the corresponding encoder block as well as the output of the decoder block immediately preceding the decoder block and concatenates the outputs before performing future processing.

The discriminator 122 includes a second CNN with an encoder-decoder architecture. The second CNN includes multiple blocks arranged in series, including multiple encoder blocks (illustrated as solid blocks) and multiple decoder blocks (illustrated as striped blocks). In various implementations, the ground truth nonselective image 202 and the estimated selective image 204 are input into the second CNN, the blocks in the second CNN process the images, and the second CNN outputs a prediction indicator 206. The prediction indicator 206 indicates whether the discriminator 122 predicts that the estimated selective image 204 is a ground truth image. In some cases, the prediction indicator 206 is a binary "true" or "false." In some implementations, the prediction indicator 206 is numerical, such as a probability.

According to various implementations, an example block includes a convolutional layer that convolves and/or cross-correlates at least one image filter (defined according to at least one parameter) with an input image and outputs an output image based on the convolution and/or cross-correlation, wherein the input image is received from an upstream block and/or the output image is output to at least one downstream block. In particular implementations, an example block further includes a batch normalization layer and/or a rectifier layer (e.g., a rectified linear unit (ReLU). An example encoder block applies a filter that reduces at least one spatial dimension of its respective input image and an example decoder block applies a filter that expands at least one spatial dimension of its respective input image. The various parameters in the encoder blocks and the decoder blocks of the first CNN and the second CNN are optimized based on training data (e.g., the training data 116) and an objective function (e.g., Formula 4 and/or Formula 7).

Figure 4:
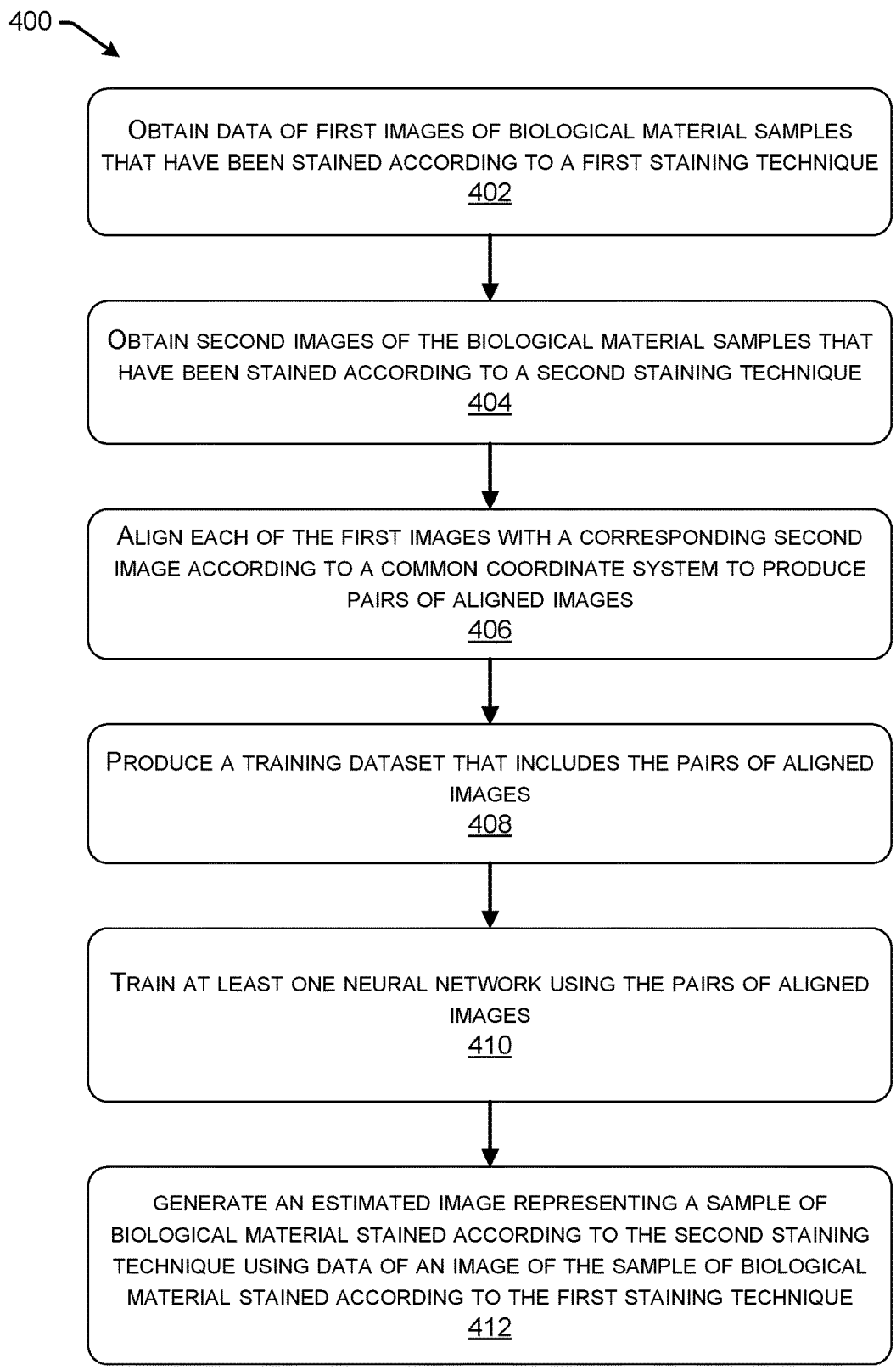
FIG. 4 is a flow diagram of a process to capture an image of a sample of biological material stained according to a first staining technique and use data of the image to generate additional images representing the sample of biological material stained according to additional staining techniques.

FIGS. 3 and 4 illustrate example processes related to generating images of biological material stained according to various staining techniques using data of images of the biological material stained according to an initial staining technique. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 3 is a flow diagram of a process 300 to generate images of biological material stained according to various staining techniques using data of images of the biological material stained according to an initial staining technique. At 302, the process 300 includes obtaining data of a first image of a sample of biological material. The sample of biological material can be stained according to a first staining technique. The sample of biological material can include a tissue sample obtained from a subject, such as a human.

At 304, the process 300 includes generating, based on the data of the first image, a second image of the sample of biological material, the second image representing the sample of biological material being stained according to a second staining technique. In various implementations, the second image can be generated using a model generated by conditional generative adversarial networks. In particular implementations, the model can be generated by capturing first additional images of biological material samples that have been stained according to the first staining technique and capturing second additional images of the biological material samples that have been stained according to the second staining technique. In certain examples, the first additional images and the second additional images can be captured via one or more image capture devices, such as a camera. Additionally, a training dataset can be produced to generate the model, where the training dataset includes the first images and the second images. The training set may also include additional images, e.g., of biological samples obtained from other subjects. In some cases, the images in the training set can be selected according to a feature-guided training set selection technique (e.g., an example of which is described with reference to Example 2). For instance, the first images and the second images can be selected according to the feature-guided training set selection technique. The training dataset can be utilized to determine correlations between the first images and the second images. The model can then be generated based at least partly on the correlations.

In particular implementations, the first staining technique can be a nonselective staining technique and the second technique can be an immunofluorescence staining technique or an immunohistochemistry staining technique. For example, the first staining technique can be a hematoxylin and eosin staining technique. In additional examples, the second staining technique can be a pan-cytokeratin (pan-CK) staining technique, an α-SMA staining technique, a DAPI staining technique, or a Ki-67 staining technique.

FIG. 4 is a flow diagram of a process 400 to generate a model to translate images of biological material stained according to a first staining technique into images representing the biological material stained according to a second staining technique. At 402, the process 400 includes obtaining data of first images of biological material samples that have been stained according to a first staining technique. At 404, the process 400 includes obtaining second images of the biological material samples that have been stained according to a second staining technique.

At 406, the process 400 includes aligning each of the first images with a corresponding second image according to a common coordinate system to produce pairs of aligned images. In order to register different stained images, we utilize feature-based techniques to automate the registration process. In order to find better matching features, we use segmented nuclei mask for H&E image (first stained image) and the DAPI (DNA) channel for second stained image. Once we detect similar patterns in both images, we extract feature descriptors, match features by using their descriptors and retrieve locations of corresponding points for each image. Then, we estimate transformation corresponding to the matching point pairs using the statistically robust M-estimator Sample Consensus (MSAC) algorithm and recover the scale and angle by using the geometric transform. In particular examples, aligning the first images and the second images can include partitioning a first image of a sample of biological material into a plurality of portions, and partitioning a second image of the sample of biological material into the plurality of portions. The first image representing the sample of biological material can be stained according to a hematoxylin staining technique and the second image representing the sample of biological material can be stained according to a DAPI staining technique. Subsequently, first nuclei included in a first portion of the plurality of portions of the first image can be aligned with second nuclei included in an additional first portion of the plurality of portions of the second image.

At 408, the process 400 includes producing a training dataset that includes the pairs of aligned images. At 410, the process 400 includes training a model using the pairs of aligned images. The model may, in some cases, include at least one neural network. For example, at 410, the process 400 includes determining correlations between features of individual first images and individual second images included in each pair of aligned images included in the pairs of aligned images. The correlations can be used to optimize parameters of the neural network(s).

At 412, the process 400 includes generating, using the model, an estimated image representing a sample of biological material stained according to the second staining technique using data of a ground truth image of the sample of biological material stained the first staining technique. In various examples, the staining technique can include an IF staining technique and/or a selective staining technique and the additional staining technique can include a nonselective staining technique.

The model can be generated using a generator operating in conjunction with a discriminator. The generator can generate images representing biological material stained according to a first staining technique based on data of additional images of the biological material stained according to a second staining technique. In particular implementations, the generator can generate an image representing a sample of additional biological material stained according to the second staining technique and the discriminator generates a numerical score indicating a prediction that the image is included in the training dataset. In some examples, the discriminator can determine that the image is not included in the training dataset and the model can then be modified based at least partly on the prediction being in error. In other examples, the discriminator can determine that the image is included in the training dataset. In certain implementations, the model is trained using a first number of the plurality of portions and the model is tested using a remainder of the plurality of portions.

Figure 5:
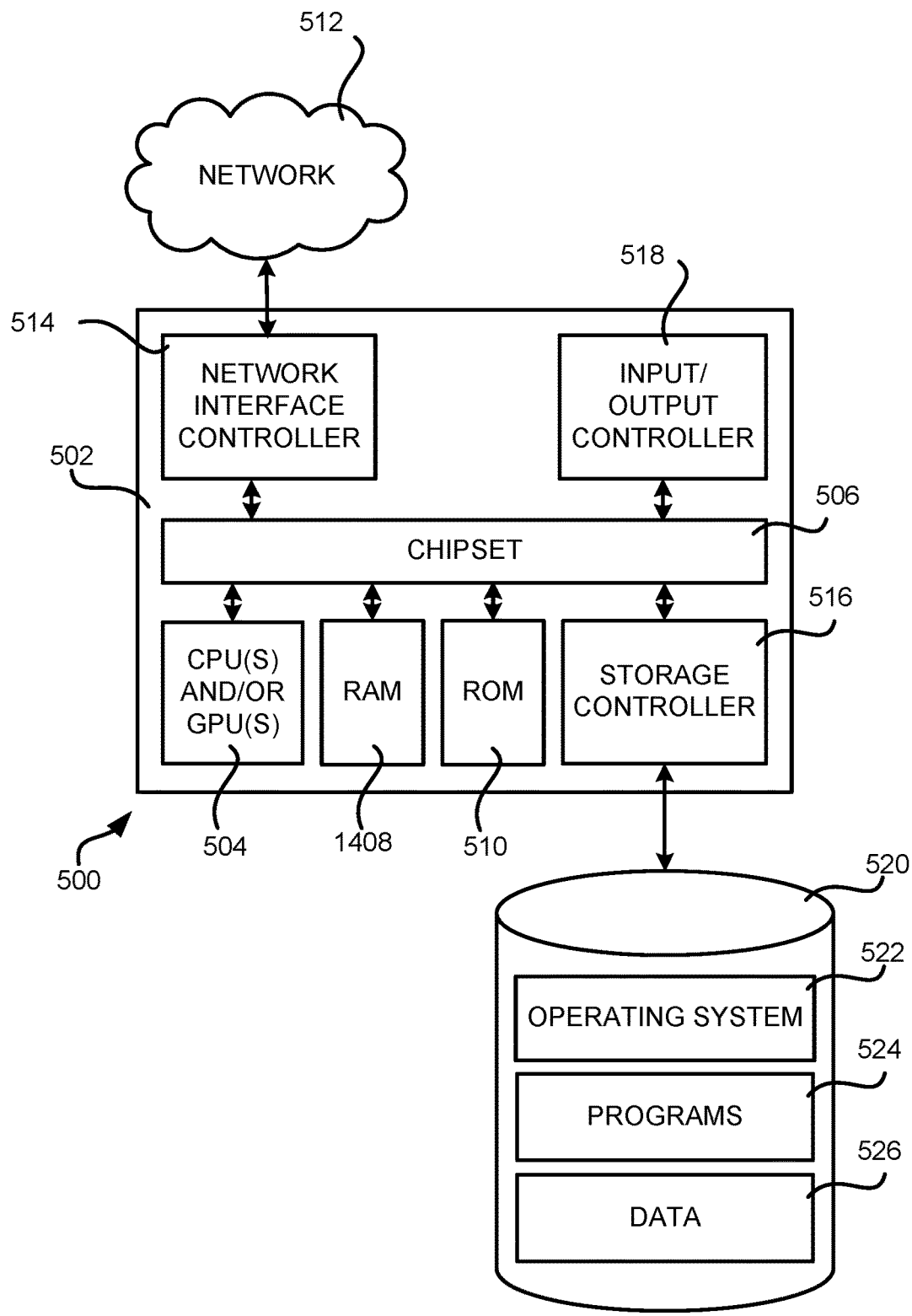
FIG. 5 is a flow diagram of a process to generate a model to translate images of biological material stained according to a first staining technique into images representing the biological material stained according to a second staining technique.

FIG. 5 shows an example computer architecture for a computer 500 capable of executing program components for implementing the functionality described above. The computer architecture shown in FIG. 5 illustrates a conventional server computer, workstation, desktop computer, laptop, tablet, network appliance, e-reader, smartphone, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") and/or graphical processing units ("GPUs") 504 operate in conjunction with a chipset 506. The CPUs can be standard programmable processors that perform arithmetic and logical operations necessary for the operation of the computer 500. The GPUs can include programmable processors for performing parallel operations. In some cases, the GPUs can be programmed to perform image and/or video processing. The GPUs can render pixels that are representative of an image on a display. GPUs may include a dedicated hardware unit having fixed function and programmable components for rendering graphics and executing GPU applications.

The CPUs and/or GPUs 504 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs and/or GPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 512. The chipset 506 can include functionality for providing network connectivity through a NIC 514, such as a gigabit Ethernet adapter. The NIC 514 is capable of connecting the computer 500 to other computing devices over the network 510. It should be appreciated that multiple NICs 514 can be present in the computer 500, connecting the computer to other types of networks and remote computer systems.

The computer 500 can be connected to a mass storage device 520 that provides non-volatile storage for the computer. The mass storage device 520 can store an operating system 522, programs 542, and data, which have been described in greater detail herein. The mass storage device 520 can be connected to the computer 500 through a storage controller 516 connected to the chipset 506. The mass storage device 520 can consist of one or more physical storage units. The storage controller 516 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the mass storage device 520 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 520 is characterized as primary or secondary storage, and the like.

For example, the computer 500 can store information to the mass storage device 520 by issuing instructions through the storage controller 516 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the mass storage device 520 by detecting the physical states or characteristics of one or more particular locations within the physical storage units.

In addition to the mass storage device 520 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 520 can store an operating system 522 utilized to control the operation of the computer 500. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 520 can store other system or application programs 524 and data 526 utilized by the computer 500. For example, the programs 524 may include at least one of the captured imaging processing system 11, the feature-guided training set selector 120, the discriminator 122, or the generator 124 described above with reference to FIGS. 1 and 2. According to various examples, the programs 524 may include a program configured to optimize parameters of the discriminator 122 and/or the generator 124 based on training data and/or a training set of paired images of selectively and nonselectively stained tissue samples. In some cases, the data 526 can include one or more of the nonselective image 112, the data stored in the image database(s) 104, the estimated selective image(s) 114, the training data 116, the nonselective image 202, the estimated selective image 204, or the prediction indicator 206 described above with reference to FIGS. 1 and 2.

In one configuration, the mass storage device 520 or other computer-readable storage media is encoded with computer-executable instructions which, when loaded into the computer 500, transform the computer from a general-purpose computing system into a special-purpose computer capable of implementing the configurations described herein. These computer-executable instructions transform the computer 500 by specifying how the CPUs and/or GPUs 504 transition between states, as described above. According to one configuration, the computer 500 has access to computer-readable storage media storing computer-executable instructions which, when executed by the computer 500, perform the various processes described above with regard to FIGS. 1-4. The computer 500 can also include computer-readable storage media for performing any of the other computer-implemented operations described herein.

The computer 500 can also include one or more input/output controllers 518 for receiving and processing input from a number of input devices, such as a keyboard, a mouse, a touchpad, a touch screen, an electronic stylus, or other type of input device. Similarly, an input/output controller 518 can provide output to a display, such as a computer monitor, a flat-panel display, a digital projector, a printer, or other type of output device. For example, the input/output controllers 518 may process input from at least one image capture device, such as the image capture device(s) 102 described above with reference to FIG. 1. It will be appreciated that the computer 500 might not include all of the components shown in FIG. 5, can include other components that are not explicitly shown in FIG. 5, or can utilize an architecture completely different than that shown in FIG. 5. For example, the computer 500 may, in some cases, include at least one image capture device. In various implementations, the computer 500 may include and/or embody at least one of the image capture device(s) 102, the image database(s) 104, the image translation system 106, or the computing device 108 described above with reference to FIG. 1.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

The following Example Clauses and Examples illustrate various implementations of the present disclosure.

EXAMPLE CLAUSES

1. A method including identifying first images of first samples stained according to a first staining technique; identifying second images of the first samples stained according to a second staining technique; and training at least one neural network based on the first images and the second images.

2. The method of clause 1 further including identifying third images of second samples stained according to the first staining technique; using a VAE to identify feature vectors of the third images; identifying a predetermined number of the most representative third images based on the feature vectors; and selecting a set of the second samples corresponding to the predetermined number of the most representative third images as the first samples.

3. A method including identifying a fourth image of a third sample stained according to a first staining technique; and generating an estimate of a fifth image of the third sample stained according to a second staining technique by inputting the fourth image into at least one neural network.

4. A method including one or more of the methods of clauses 1 to 3.

5. The method of clause 4 wherein the first staining technique includes a nonselective staining technique.

6. The method of clause 4 wherein the first staining technique includes an H&E staining technique and/or a DAPI staining technique.

7. The method of any of clauses 4 to 6 wherein the second staining technique includes a selective staining technique.

7.5. The method of any of clauses 4 to 7, wherein the second staining technique includes at least one of a DAPI staining technique, a panCK staining technique, or an α-SMA staining technique and/or wherein the second staining technique is different than the first staining technique.

8. The method of any of clauses 4 to 7.5 wherein a sample includes a biological tissue sample.

9. The method of clause 8 wherein the sample includes a biopsy.

10. The method of any of clauses 4 to 9 wherein the at least one neural network includes cGANs.

11. The method of clause 10 wherein the cGANs include a generator and a discriminator.

12. The method of clause 11 wherein the generator is configured to translate images of samples stained according to the first staining technique into estimated images of the samples stained according to the second staining technique.

13. The method of clause 11 or 12 wherein the discriminator is configured to predict whether an image is a ground truth image of a sample stained according to the second staining technique.

14. The method of any of clauses 11 to 13 wherein the generator includes a CNN.

15. The method of any of clauses 11 to 14 wherein the discriminator includes a CNN.

16. The method of clause 14 or 15 wherein the CNN(s) includes one or more convolutional layers.

17. The method of clause 16 wherein training the at least one neural network includes optimizing parameters of the convolutional layer(s) according to an objective function.

18. The method of clause 17 wherein the objective function includes Formula 4 and/or Formula 7.

19. The method of any of clauses 14 to 18 wherein the CNN(s) include one or more batch normalization layers, one or more concatenation layers, and/or one or more ReLU layers.

20. The method of any of clauses 4 to 19 further including identifying the fifth image; and comparing the fifth image to the estimate of the fifth image.

21. The method of clause 20 wherein the estimate includes first pixels and the fifth image includes second pixels, the first pixels matching at least 90% of the second pixels.

22. The method of any of clauses 4 to 21 further including generating aligned images by spatially aligning each of the first images with a respective second image, wherein training the neural network(s) includes using the aligned images to train the neural network(s).

23. The method of any of clauses 4 to 22 further including preprocessing at least one of the first images, second images third images, or fourth image by at least one of downscaling the images, registering the images, reducing technical noise in the images, normalizing intensity of pixels in the images, tiling the images to generate image tiles, or discarding one or more images and/or image tiles according to a predetermined rule.

24. The method of clause 23 wherein the predetermined rule includes discarding any images and/or image tiles that contain more than a threshold amount of background.

25. The method of any of clauses 4 to 24 wherein the estimate is generated without relying on the fifth image.

26. The method of any of clauses 4 to 25, wherein the at least one neural network includes one or more of cGANs trained according to Formula 4, cGANs trained according to Formula 7, or an LFD model.

27. The method of clause 26 wherein the estimate is generated by averaging outputs of two or more of the cGANs trained according to Formula 4, the cGANs trained according to Formula 7, or the LFD model.

28. The method of any of clauses 4 to 27 wherein the first images, the second images, the third images, and/or the fourth image include ground truth images.

29. The method of any of clauses 4 to 27 wherein the neural network(s) include a stream of blocks arranged in a series.

30. The method of clause 29 wherein a selected block among the blocks includes a convolution layer configured to convolve or cross-correlate a filter with a first input image, a batch normalization layer configured to normalize a second input image, and a ReLu layer configured to rectify a third input image.

31. The method of clause 30, wherein the selected block includes a concatenation layer, the concatenation layer being configured to concatenate a fourth input image with a fifth input image.

32. The method of clause 31, wherein the fourth input image includes a first output image of a first upstream block in the series and the fifth input image includes a second output image of a second upstream block in the series, the first upstream block being immediately upstream of the selected block, the first upstream block being different than the second upstream block.

33. The method of clause 32, wherein a first dilation rate of the convolution layer in the selected block is the reciprocal of a second dilation rate of a convolution layer in the second upstream block.

34. The method of any of clauses 4 to 33 wherein identifying the predetermined number of the most representative third images based on the feature vectors includes applying Formula 10 to identify at least one of the most representative third images.

35. The method of any of clauses 4 to 34 further including causing a computing device to display the estimate.

36. The method of any of clauses 4 to 35 wherein training the neural network(s) includes identifying first tiles of the first images; identifying second tiles of the second images and training the neural network(s) based on the first tiles and the second tiles.

37. The method of any of clauses 4 to 35 wherein generating the estimate includes identifying third tiles of the fourth image and generating estimated tiles of fourth tiles in the fifth image, the estimate including the estimated tiles.

38. The method of any of clauses 4 to 37 wherein one or more of the first images, the second images, the third images, the fourth image, or the fifth image include WSI(s).

39. The method of any of clauses 4 to 38 further including staining at least one of the first samples, the second samples, or the third samples.

40. The method of any of clauses 4 to 39 further including causing one or more image capture devices to capture at least one of the first images, the second images, the third images, the fourth image, or the fifth image.

41. The method of any of clauses 4 to 40 further including extracting, from one or more image database(s), at least one of the first images, the second images, the third images, the fourth image, or the fifth image.

42. A method including obtaining data of a first image of a sample of biological material, the sample of biological material being stained according to a first staining technique; and generating, based on the data of the first image, a second image of the sample of biological material, the second image representing the sample of biological material being stained according to a second staining technique.

43. The method of clause 42 wherein the second image is generated using a model generated by cGANs.

44. The method of clause 42 or 43 further including capturing additional first images of biological material samples that have been stained according to the first staining technique; capturing additional second images of the biological material samples that have been stained according to the second staining technique; and producing a training dataset to generate the model, wherein the training dataset includes the additional first images and the additional second images.

45. The method of clause 44 wherein the additional first images and the additional second images are captured via one or more image capture devices.

46. The method of any of clauses 42 to 45, further including determining correlations and/or associations between the additional first images and the additional second images; and generating the model based at least partly on the correlations and/or associations.

47. The method of any of clauses 42 to 46, wherein the first staining technique includes a nonselective staining technique and the second technique includes at least one of an immunofluorescence (IF) staining technique, an immunohistochemistry (IHC) staining technique, or a multiplexed staining technique.

48. The method of clause 47 wherein the first staining technique includes at least one of an H&E technique or a DAPI staining technique, and the second staining technique includes at least one of a pan-cytokeratin (pan-CK) staining technique, an α-smooth muscle actin (α-SMA) staining technique, a DAPI staining technique, or a Ki-67 staining technique, and wherein the second staining technique is different than the first staining technique.

49. A method including obtaining a sample of biological material from a subject; staining the sample of biological material according to a first staining technique to produce a stained sample of biological material; capturing, via an image capture device, a first image of the stained sample of biological material; generating, based at least partly on data corresponding to the first image, a second image of the biological material, the second image of the biological material representing the biological material stained according to a second staining technique; and displaying, via a computing device, a user interface that includes the second image.

50. The method of clause 49, wherein the image capture device is at least a component of a microscopy device.

51. The method of clause 49 or 50, further including obtaining an additional sample of biological material from an additional subject; staining the additional sample of biological material according to a first staining technique to produce a first stained additional sample of biological material; staining the additional sample of biological material according to a second staining technique to produce a second stained additional sample of biological material; capturing a first additional image of the first stained additional sample of biological material; and capturing a second additional image of the second stained additional sample of biological material.

52. The method of clause 51, further including adding the first additional image and the second additional image to a training dataset; dividing the first additional image into first sections and the second additional image into second sections; aligning first nuclei of the first sections with second nuclei of the second sections according to a common coordinate system; determining a number of correlations and/or associations between the first nuclei and the second nuclei; and generating a model that corresponds to at least a portion of the number of correlations and/or associations.

53. The method of clause 52, wherein the second image of the biological material is generated by applying the model to the data corresponding to the first image.

54. A method including obtaining data of first images of biological material samples that have been stained according to a first staining technique; obtaining second images of the biological material samples that have been stained according to a second staining technique; aligning each of the first images with a corresponding second image according to a common coordinate system to produce pairs of aligned images; producing a training dataset that includes the pairs of aligned images; determining correlations and/or associations between features of individual first images and individual second images included in each pair of aligned images included in the pairs of aligned images; and generating a model based at least partly on the correlations and/or associations, the model to generate an image representing a sample of biological material stained according to a staining technique using data of an image of the sample of biological material stained according to an additional staining technique.

55. The method of clause 54, further including: partitioning a first image of a sample of biological material into a plurality of portions, the first image representing the sample of biological material stained according to a hematoxylin and eosin staining technique; partitioning a second image of the sample of biological material into the plurality of portions, the second image representing the sample of biological material stained according to a DAPI staining technique;

and aligning first nuclei included in a first portion of the plurality of portions of the first image with second nuclei included in an additional first portion of the plurality of portions of the second image; and the first image and the second image are a pair of aligned images included in the pairs of aligned images of the training dataset.

56. The method of clause 54 or 55 wherein the model is generated using a generator operating in conjunction with a discriminator, the generator to generate images representing biological material stained according to a first staining technique based on data of additional images of the biological material stained according to a second staining technique.

57. The method of clause 56, wherein generating the model includes: the generator generating an image representing a sample of additional biological material stained according to the second staining technique; the discriminator generating a numerical score indicating a prediction that the image is representative of the training dataset; determining that the image is not included in the training dataset; and modifying the model based at least partly on the prediction being in error.

58. The method of clause 56 wherein generating the model includes: the generator generating an image representing a sample of additional biological material stained according to the second staining technique; the discriminator generating a numerical score indicating a prediction that the image is included in the training dataset; and determining that the image is included in the training dataset.

59. The method of any of clauses 54 to 58, wherein the model is trained using a first number of the plurality of portions and the model is tested using a remainder of the plurality of portions.

60. The method of any of clauses 54 to 59, wherein the staining technique includes an immunofluorescence staining technique or an immunohistochemistry staining technique and the additional staining technique includes a histopathological staining technique.

61. A non-transitory computer-readable medium storing instructions to perform the method of any of clauses 1 to 60.

62. A system including at least one processor; and memory storing instructions that, when executed by the at least one processor, cause the at least one processor to perform operations including the method of any of clauses 1 to 60.

63. The system of clause 62 further including at least one image capture device, at least one image database, and/or at least one computing device.

EXAMPLE 1

Example 1 provides a framework to efficiently translate H&E WSIs into realistic IF WSIs, and demonstrate unit test translations of panCK, α-SMA, and DAPI, two commonly used prognostic markers and a nuclear counterstain, respectively. Furthermore, this framework can be used to test whether or not tissue and cell morphologies reflect specific protein expression patterns.

EXPERIMENTS: DATASET, NETWORKS, AND EVALUATION. Example 1 utilizes a dataset (Chang, et al., Deep learning-based nucleus classification in pancreas histological images, in 39TH ANNUAL INTERNATIONAL CONFERENCE OF THE IEEE ENGINEERING IN MEDICINE AND BIOLOGY SOCIETY (EMBC), 672-675 (2017)) containing WSIs of tumorigenic pancreas tissue acquired at 20×-magnification from two adjacent thin sections: one stained with H&E and the other co-stained with the fluorescent nuclear marker DAPI and fluorescent antibodies against panCK and α-SMA, two markers commonly used in tumor evaluation (Barak, et al., CLINICAL BIOCHEMISTRY 37(7), 529-540 (2004); Sinn, et al., BRITISH JOURNAL OF CANCER 111(10), 1917-1923 (2014)). The paired 20× images were registered (see Chang et al.) and cropped into four sites, with each site image being ~12;000×8;000 pixels in size. 10×WSIs were created by half-scaling 20×WSIs. Training data were created by first taking ~10,000 random 256×256 pixel H&E and IF tile pairs from three sites, then applying single operation manipulations— i.e. jitter, rotation, flipping, Poisson noise—to each tile, yielding ~20,000 total images in the augmented training data. For a given stain, four leave-one-site-out SHIFT models were trained and inferentially-stained WSIs were generated for each site, i.e. each of four models were trained on random tiles from three sites and tested on non-overlapping tiles of the left-out site, which could then be stitched into cohesive WSIs. Thus, a fourfold cross-validation of the SHIFT method was performed for each stain in an intra-patient context. To reduce the deleterious effects of tiling artifacts in the generated panCK WSIs, three additional test datasets of non-overlapping tiles were utilized from each site-one of each test dataset offset by 128 pixels in either x or y or both—and evaluated model performance using the jointly-scaled blend of the four generated WSIs.

Figure 6:
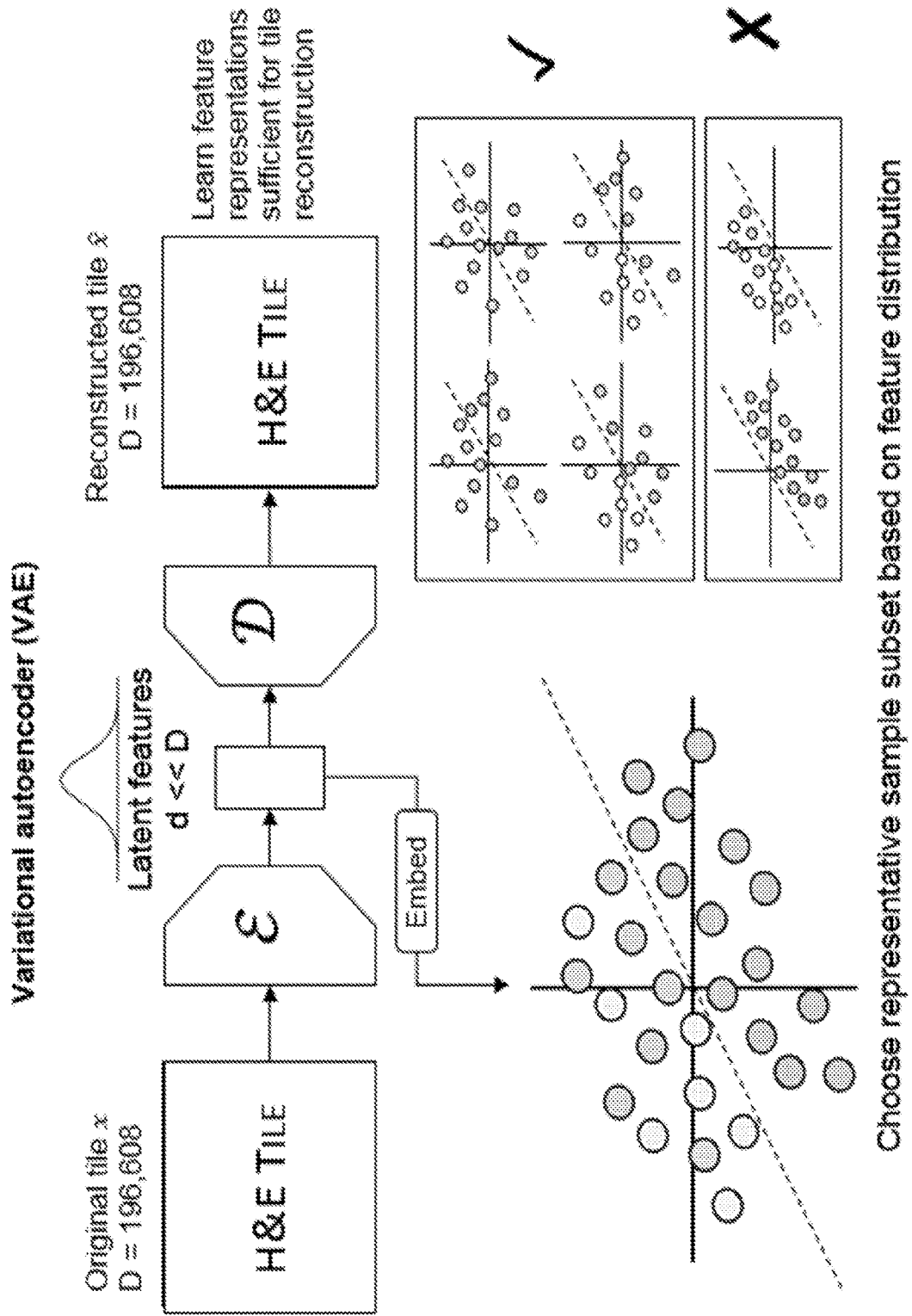
FIG. 6 illustrates an example schematic of feature-guided H&E sample selection. First, H&E samples are decomposed into 256×256 pixel tiles. Second, the H&E tiles were used to train a variational autoencoder (VAE) to learn feature representations for all tiles; for each 196,608-pixel H&E tile in the dataset, the encoder learned a compact but expressive feature representation that maximizes the ability of the decoder to reconstruct the original tile from its feature representation. Third, the tile feature representations were used to determine which samples are most representative of the whole dataset.

The network architectures and implementations for a discriminator and a generator for all models are as described in Isola, et al., *Image-to-image translation with conditional adversarial networks*, in THE IEEE CONFERENCE ON COMPUTER VISION AND PATTERN RECOGNITION (CVPR), (July 2017), except where explicitly specified. FIG. 6 illustrates an example schematic of SHIFT modeling for training and testing phases. The generator network G generates virtual IF tiles conditioned on H&E tiles. The discriminator network D learns to discriminate between real and generated image pairs. Training batch size was set to 4 for all experiments and for fair comparison, we tuned the regularization setting for each model by training over a range of λ: 50-5000 and selected the models with optimal λ* that yielded the best performance. Models were trained for 20 epochs at a fixed learning rate of 0.0002, followed by 10 epochs over which the learning rate linearly decayed to zero. Once trained, each model was able to compute WSI-level translation in less than one minute.

For evaluation of model performance, the Matthews correlation coefficient (MCC) (Matthews, BIOCHIMICA ET BIOPHYSICA ACTA (BBA)-PROTEIN STRUCTURE 405(2), 442-451 (1975)), the Dice similarity coefficient (DSC), as well as other standard classification performance metrics were used for comparison of the ground truth and generated IF masks produced using a global 10%-luminance threshold on the contrast-adjusted 8-bit ground truth and generated IF WSIs. The peak signal-to-noise ratio (PSNR) and structural similarity index (SSIM) (Wang, et al., IEEE TRANSACTIONS ON IMAGE PROCESSING 13(4), 600-612 (2004)) were also calculated between raw ground truth and raw generated IF WSIs.

RESULTS AND DISCUSSION. Translations from H&E-to-DAPI, H&E-to-panCK, and H&E-to-α-SMA were performed. Results of the translations from H&E-to-DAPI are shown in Table 2:

TABLE 2

H&E to DAPI Results

| Mag. | Site Gen. | G* | λ* | MCC | DSC | Accu. | Spec. | Prec. | Sens. | PSNR | SSIM |
|---|---|---|---|---|---|---|---|---|---|---|---|
| 10X | 1 | Form. 4 | 5000 | 0.838 | 0.885 | 0.932 | 0.938 | 0.857 | 0.916 | 30.890 | 0.883 |
|  |  | Form. 7 | 1000 | 0.845 | 0.890 | 0.936 | 0.951 | 0.811 | 0.898 | 31.400 | 0.887 |
| 20X | 1 | Form. 4 | 500 | 0.857 | 0.897 | 0.942 | 0.965 | 0.910 | 0.886 | 31.530 | 0.883 |
|  |  | Form. 7 | 5000 | 0.861 | 0.900 | 0.944 | 0.966 | 0.913 | 0.887 | 31.500 | 0.898 |

DAPI experiments were performed at both 10×- and 20×-magnification to assess whether SHIFT model inference is sensitive to image resolution, and found minor improvements in most metrics when models were trained on 20× tiles, suggesting that localized features of the DAPI stain may be more important for H&E-to-DAPI inference than higher-level architectural features. Since hematoxylin and DAPI are both robust stains for cell nuclei, the task of an H&E-to-DAPI model is theoretically trivial-translate hematoxylin intensity into DAPI intensity—and thus provides insight into the upper limits of model performance. Note that there exists μm-scale structural differences between ground truth H&E and IF WSIs due to serial tissue acquisition. Nevertheless, the results for models utilizing Formula 7 are consistent with those from a comparison between the DAPI mask and a cell nucleus segmentation mask derived from the H&E image, indicating that the model achieves good performance up to the fundamental limit.

Results of the translations from H&E-to-panCK are shown in Table 3:

TABLE 3

H&E to panCK Results

| Mag. | Site Gen. | G | λ* | MCC | DSC | Accu. | Spec. | Prec. | Sens. | PSNR | SSIM |
|---|---|---|---|---|---|---|---|---|---|---|---|
| 10X | 1 | Form. 4 | 1000 | 0.704 | 0.749 | 0.909 | 0.918 | 0.662 | 0.863 | 22.990 | 0.769 |
|  |  | Form. 7 | 1000 | 0.754 | 0.793 | 0.933 | 0.953 | 0.766 | 0.822 | 22.950 | 0.791 |
|  |  | Ensemble | — | 0.729 | 0.769 | 0.917 | 0.922 | 0.679 | 0.887 | 23.190 | 0.782 |
|  | 2 | Form. 4 | 1000 | 0.817 | 0.855 | 0.937 | 0.946 | 0.812 | 0.903 | 28.210 | 0.819 |
|  |  | Form. 7 | 1000 | 0.814 | 0.853 | 0.939 | 0.959 | 0.845 | 0.861 | 27.890 | 0.816 |
|  |  | Ensemble | — | 0.821 | 0.859 | 0.938 | 0.948 | 0.819 | 0.903 | 28.660 | 0.828 |
|  | 3 | Form. 4 | 1000 | 0.790 | 0.822 | 0.945 | 0.965 | 0.810 | 0.834 | 26.360 | 0.815 |
|  |  | Form. 7 | 1000 | 0.777 | 0.807 | 0.945 | 0.978 | 0.860 | 0.760 | 26.160 | 0.818 |
|  |  | Ensemble | — | 0.790 | 0.822 | 0.944 | 0.958 | 0.786 | 0.862 | 26.690 | 0.828 |
|  | 4 | Form. 4 | 1000 | 0.812 | 0.849 | 0.940 | 0.967 | 0.865 | 0.833 | 26.050 | 0.807 |
|  |  | Form. 7 | 1000 | 0.792 | 0.826 | 0.936 | 0.981 | 0.908 | 0.758 | 25.870 | 0.810 |
|  |  | Ensemble | — | 0.819 | 0.854 | 0.943 | 0.972 | 0.881 | 0.828 | 26.350 | 0.818 |

Given that panCK will stain only the subset of cells which are CK-positive, rather than stain a ubiquitous cytological landmark as do hematoxylin and DAPI, the translation from H&E to panCK is a more interesting but challenging task. Although the panCK models performed less well than the DAPI in most categories, it is difficult to visually distinguish the generated from the ground truth panCK IF WSIs. With one exception (the sensitivity of panCK for site 4), either the models utilizing the Formula 7 alone or the ensemble approach performed as well as or better than models utilizing Formula 4 alone, i.e., unmodified pix2pix. Notably, models utilizing Formula 7 showed better localization characteristics than models utilizing Formula 4.

Results of the translations from H&E-to-α-SMA are shown in Table 4:

TABLE 4

H&E to α-SMA Results

| Mag. | Site Gen. | G* | λ* | MCC | DSC | Accu. | Spec. | Prec. | Sens. | PSNR | SSIM |
|---|---|---|---|---|---|---|---|---|---|---|---|
| 10X | 1 | Form. 4 | 1000 | — | — | — | — | — | — | 24.700 | 0.603 |
|  |  | Form. 7 | 1000 | — | — | — | — | — | — | 24.840 | 0.608 |
|  |  | Ensemble | — | — | — | — | — | — | — | 25.090 | 0.611 |
|  | 2 | Form. 4 | 1000 | — | — | — | — | — | — | 25.690 | 0.634 |
|  |  | Form. 7 | 1000 | — | — | — | — | — | — | 25.810 | 0.642 |
|  |  | Ensemble | — | — | — | — | — | — | — | 26.020 | 0.643 |

TABLE 4-continued

H&E to α-SMA Results

| Mag. | Site Gen. | G* | λ* | MCC | DSC | Accu. | Spec. | Prec. | Sens. | PSNR | SSIM |
|---|---|---|---|---|---|---|---|---|---|---|---|
| | 3 | Form. 4 | 1000 | — | — | — | — | — | — | 24.190 | 0.588 |
| | | Form. 7 | 1000 | — | — | — | — | — | — | 24.410 | 0.598 |
| | | Ensemble | — | — | — | — | — | — | — | 24.740 | 0.606 |
| | 4 | Form. 4 | 1000 | — | — | — | — | — | — | 25.210 | 0.634 |
| | | Form. 7 | 1000 | — | — | — | — | — | — | 26.340 | 0.675 |
| | | Ensemble | — | — | — | — | — | — | — | 26.390 | 0.674 |

In contrast to DAPI and panCK stain patterns, the α-SMA stain pattern is sinuous and high-frequency. When these attributes are compounded by spatial deformity and other complications from the serial acquisition of H&E and IF WSIs, pixel-level evaluation of generated α-SMA WSIs becomes exceedingly challenging. Accordingly, evaluation metrics that were contingent on α-SMA mask generation were excluded in favor of metrics which reflect the global configurations of the α-SMA IF WSIs. While the ensemble approach performed best in both categories for most sites, all models utilizing Formula 7 alone outperformed the models utilizing Formula 4 alone.

CONCLUSION. The results presented in this proof-of-concept study demonstrate that the proposed methods can rapidly and accurately infer the distribution of clinically relevant markers in histopathological images.

EXAMPLE 2

Example 2 shows testing of the generalizability of virtual IF staining by an example model through model validation on a limited but morphologically heterogeneous PDAC dataset including images of samples from multiple patients.

EXPERIMENTS: DATASET, NETWORKS, AND EVALUATION. Four samples (samples A through D) from individuals diagnosed with moderately differentiated pancreatic ductal adenocarcinoma (PDAC) diagnosed as moderately differentiated adenocarcinoma were retrieved. H&E-stained sections of the samples were secondarily reviewed by two board-certified surgical pathologists tasked to identify and classify areas of tumor heterogeneity in representative sections from each case. Discrepancies between pathologists were ameliorated by consensus review. Representative samples preserved in formalin-fixed paraffin embedded blocks were acquired from the Brenden-Colson Center for Pancreatic Care from consented patients of the Oregon Pancreatic Tumor Registry in participation with OHSU. Samples were chosen via pathological review as exemplifying a spectrum of both histological differentiation and heterogeneity.

Gold standard review of histologic sections by pathologists tasked with identifying heterogeneous differences in PDAC tumor morphology and grade revealed interobserver agreement in the identification of areas of squamous differentiation in one case and various tumor grades within neoplasms in the other three cases. All four cases were predominantly grade 2 adenocarcinoma and there was no disagreement evaluating marked regions of interest. The case with areas of squamous differentiation did not clearly meet the 30% threshold for adenosquamous classification. The other three cases were predominantly grade 2 with foci of grade 1 and others with grade 3.

Formalin-fixed paraffin-embedded tissue blocks were serially sectioned by the OHSU Histopathology Shared Resource. From each block, three sections were cut in order to generate a standard H&E for pathological review and downstream analysis, a second serial section of tissue for immunofluorescence staining/post-immunofluorescence H&E staining, and a third section for secondary only control. After sectioning, the second serial tissue section was immediately baked at 55° C. for 12 hours and subjected to standard deparaffinization; the slides underwent standard antigen retrieval processing, washing, and blocking. Upon completion, primary antibodies were diluted and applied.

α-SMA (Mouse monoclonal antibody, IgG2a, Clone: 1A4; Pierce/Invitrogen, cat #MA5-11547) was diluted to 1:200 with Ki-67 (D3B5), (Rabbit monoclonal antibody, IgG, Alexa Fluor®647 Conjugate; Cell Signaling Technology, cat #12075S) diluted to 1:400, along with panCK (AE1/AE3) (Mouse monoclonal antibody, IgG1, Alexa Fluor®488 Conjugate; ThermoFisher, cat #53-9003-82), which was diluted to 1:200 in 10% Normal Goat Serum in 1% Bovine Serum Albumin in Phosphate Buffered Saline. Primary antibodies were diluted and incubated overnight at 4° C. After incubation, secondary antibody (Goat anti-mouse monoclonal antibody, IgG2A, Alexa Fluor®555 Conjugate; Life Technologies, cat #A21137), at 1:200 dilution was applied to the slides and incubated at room temperature for one hour. After incubation slides were washed and mounted with Slowfade Gold Antifade Mountant with DAPI (Fisher Scientific, cat #S36936) in preparation for image acquisition.

After the IF stained slides were scanned and the immunofluorescence staining verified, the glass coverslips were removed and the slides were processed for post-IF H&E staining. Post-IF H&E staining was performed with the Leica Autostainer XL staining system at the OHSU Histopathology Shared Resource with the modified staining protocol described in Table 5 below:

TABLE 5

Modified Staining Protocol

| Step | Duration |
|---|---|
| Hematoxylin | 10 minutes |
| Wash in water | 1 minute |
| Acid alcohol (.5% HCl in 70% Ethanol) | 8 seconds |
| Wash in water | 25 seconds |
| Bluing solution | 2 minutes |
| Wash in water | 20 seconds |
| 80% Ethanol/water | 25 seconds |
| Eosin | 10 seconds |
| 80% Ethanol/water | 25 seconds |
| 95% Ethanol/water | 20 seconds |
| 100% Ethanol | 25 seconds (2 times) |
| Xylene | 25 seconds (5 times) |

Slides were scanned with the Zeiss Axio Scan.Z1 slide scanner with the 20× objective in both brightfield and immunofluorescence scanning. Carl Zeiss Images (CZI) were acquired using Zeiss Zen software. CZI images from the Zeiss Axioscan Slide Scanner were processed with the Zeiss Blue Zen Lite microscope software package. Brightfield and immunofluorescence images were manually annotated and exported as TIFF files for downstream image processing.

Raw H&E and IF WSIs were pre-processed to remove technical noise, account for between-sample intensity variation, and align paired H&E and IF WSIs in a shared coordinate system. To do so, the following pipeline was used: (1) Downscaling: 20×WSI are downscaled by a factor of 2 in x and y dimensions to generate 10×WSIs. Experiments were performed using either 20× or 10× images. The tested models performed best when using 10× images. (2) Registration: H&E and IF WSIs are spatially registered using SURF features (Bay et al., COMPUTER VISION—ECCV 2006, 2006; Chang et al., 2017 39TH ANNUAL INTERNATIONAL CONFERENCE OF THE IEEE ENGINEERING IN MEDICINE AND BIOLOGY SOCIETY (EMBC), 2017) extracted from hematoxylin and DAPI binary masks of nuclei generated by Otsu's method, respectively. (3) Technical noise reduction: IF WSIs are median filtered with a 5-pixel-radius disk structuring element. (4) Intensity normalization: H&E WSI pixel intensities are normalized as previously described (Macenko et al., PROC. —2009 IEEE INT. SYMP. BIOMED. IMAGING NANO MACRO ISBI 2009, 2009). Following Christiansen et al. (CELL, 2018), IF WSI pixel intensities are normalized to have a fixed mean=0.25 and standard deviation=0.125, then clipped to fall within [0,1]. (5) Image tiling: WSIs are tiled into non-overlapping 256×256 pixel tiles, such that each H&E tile has a corresponding spatially-registered IF tile. H&E tiles that contained more than 50% background were removed along with the corresponding IF tiles. Each 10×WSI is comprised of hundreds or thousands of non-overlapping 256×256 pixel tiles.

FIG. 6 illustrates an example schematic of feature-guided H&E sample selection, as used in Example 2. First, H&E samples are decomposed into 256×256 pixel tiles. Second, the H&E tiles were used to train a variational autoencoder (VAE) to learn feature representations for all tiles. The VAE includes an encoder and a decoder, each of which includes a CNN. For each 196,608-pixel H&E tile in the dataset, the encoder learns a compact but expressive feature representation (i.e., a multi-dimensional feature vector) that maximizes the ability of the decoder to reconstruct the original tile from its feature representation. Third, the tile feature representations are used to determine which samples are most representative of the whole dataset. The samples that were most representative were predicted to be the minimum set of samples that could maximally train various DL models configured to generate virtual IF images and/or tiles. In Example 2, multiple selections of samples were selected based on the feature representations, and the selections were used to train various models including a SHIFT model.

Figure 7:
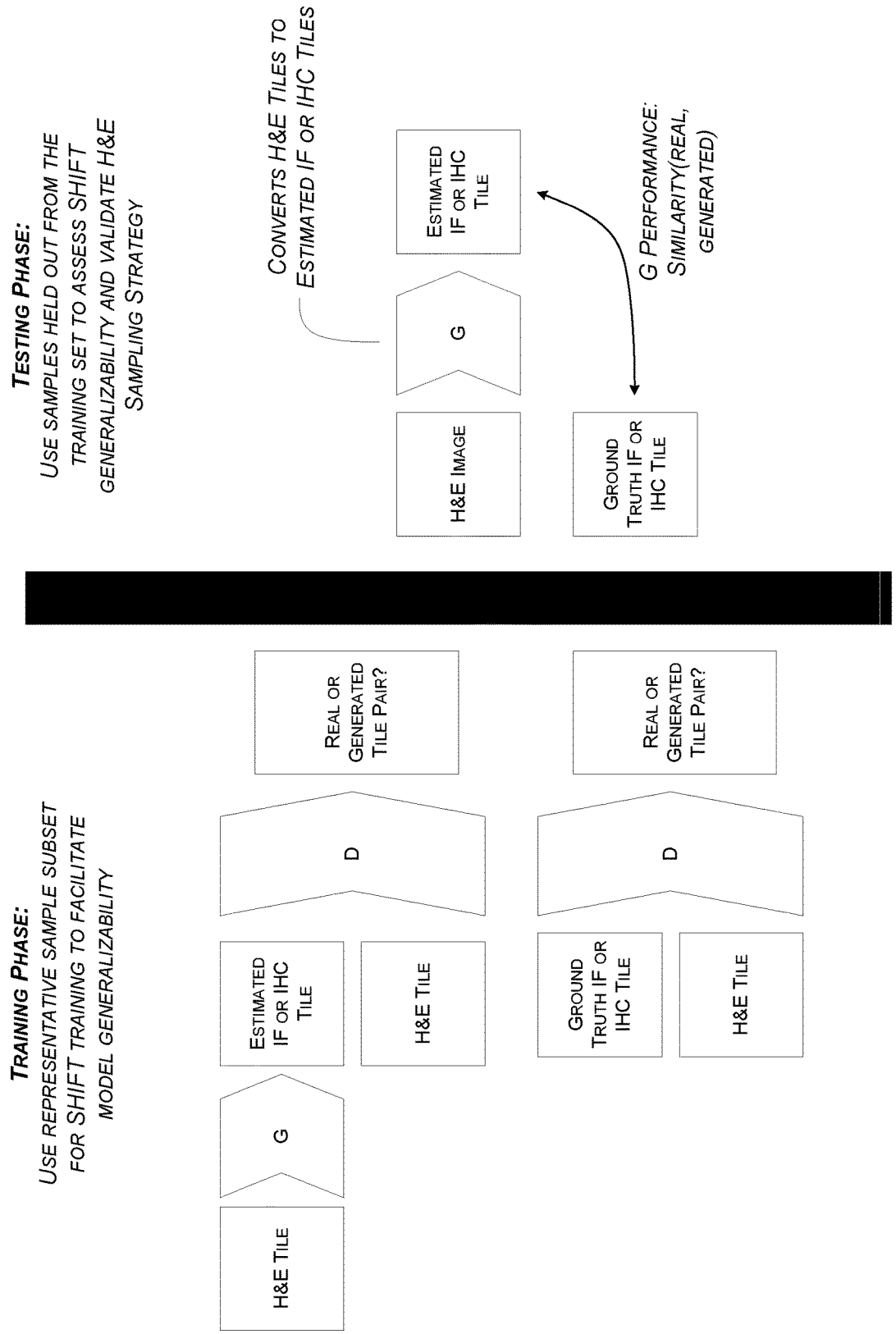
FIG. 7 illustrates an example schematic of SHIFT modeling for training and testing phases. The generator network G generates virtual IF tiles conditioned on H&E tiles. The discriminator network D learns to discriminate between real and generated image pairs.
Figure 8A:
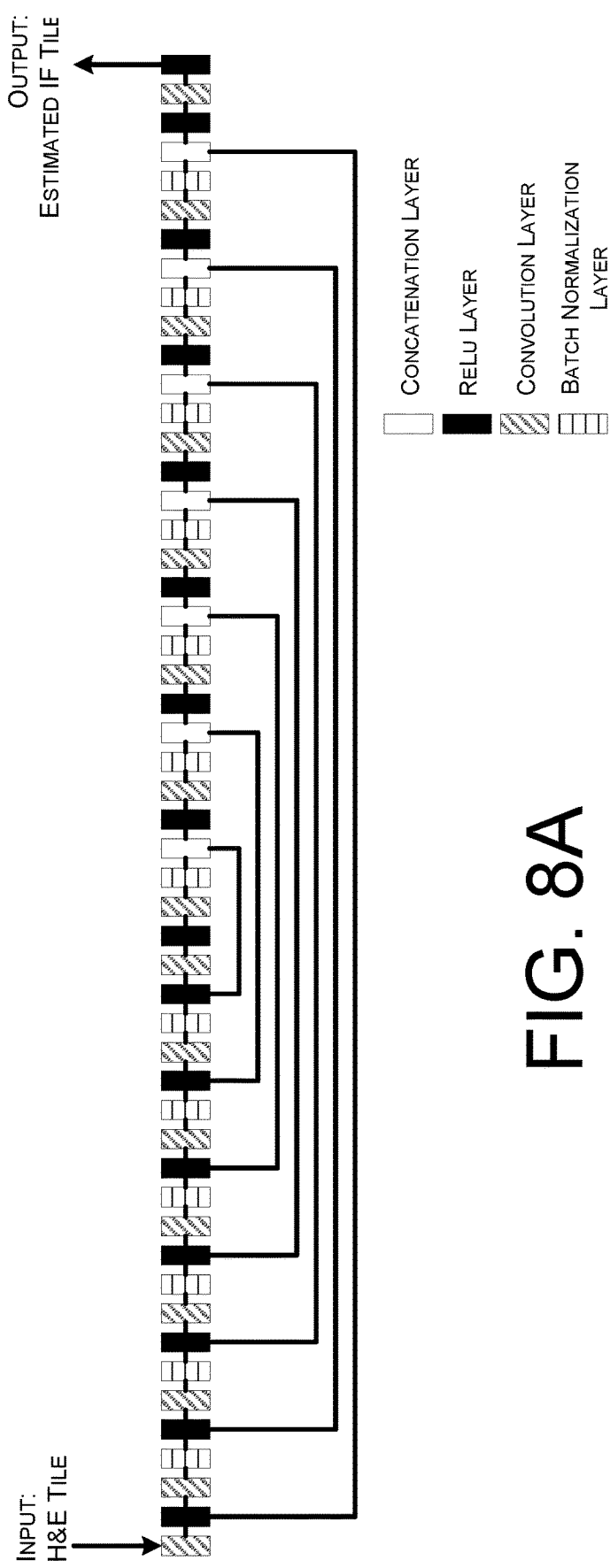
FIGS. 8A and 8B illustrate example schematics of a conditional generative adversarial network (cGAN) architecture used by an example SHIFT model. The cGAN architecture illustrated in FIGS. 8A and 8B is based on the pix2pix framework (Isola et al., ARXIV161107004 Cs, 2016).
Figure 8B:
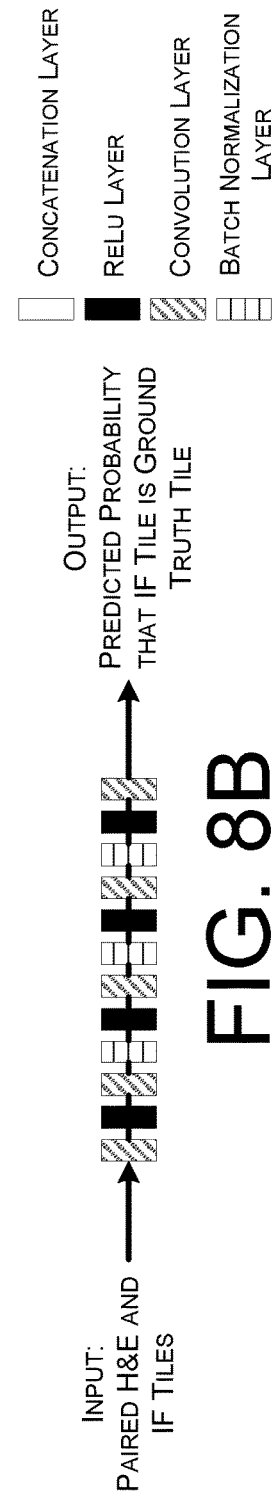

The SHIFT model (e.g., utilizing Formula 4) was utilized to generate estimated IF images based on ground truth H&E images. FIG. 7 illustrates an example schematic of SHIFT modeling for training and testing phases. FIGS. 8A and 8B illustrate example schematics of cGAN architecture used by the SHIFT model used in Example 2. The cGAN architecture used by SHIFT is based on the pix2pix framework (Isola et al.). FIG. 8A illustrates an example architecture of generator network G which is based on the U-net architecture (Ronneberger et al., ARXIV150504597 Cs, 2015). FIG. 8B illustrates an example architecture of discriminator network D. The generator network G generates virtual IF tiles conditioned on H&E tiles. The discriminator network D learns to discriminate between real and generated image pairs. H&E samples were decomposed into 256×256 pixel tiles.

In Example 2, training data included of spatially registered pairs of H&E image tiles (x) and IF image tiles (y), while test data included H&E and IF image pairs withheld from the training data. Models were trained using the Adam optimizer with a learning rate of 0.002 for 500 epochs. Training batch sizes were set to 64. The first layers of both the generator and discriminator networks were 128 filters deep. The VAE model was utilized to provide specified selection criteria function designed to sample whole slide images whose constituent tiles maximally cover the entire learned feature space with a minimal number of samples.

Label-Free Determination (LFD) (Ounkomol et al., NAT. METHODS 15, 2018) is a supervised DL-based virtual staining method which produces models that were shown to have learned the relationship between images of cell cultures visualized by transmitted light or fluorescence, where subcellular structures have been labeled with genetically-encoded fluorescent tags. Because the SHIFT generator G and the LFD are both based on the U-net architecture, these models were compared, even though the models have differing training formulae and loss functions. To make a fair comparison between the adversarial SHIFT and supervised LFD models, an LFD was trained using the representative sample subsets B1 and D5, matching the number of optimization steps taken by the SHIFT model that was trained using the same training set. In addition to the performance of independent SHIFT and LFD models, the ensemble result was also considered, taken as the average image of the SHIFT and LFD output images.

To boost the effective number of images in the training sets and improve model robustness against expected types of technical noise, image augmentations were applied to each image in each training batch using the Python library imgaug (Jung, "imgaug," 2018). Gaussian blur, flipping, affine geometric transformation, Gaussian noise, Poisson noise, rotation, and add to hue and saturation were applied in each channel. An implementation of the imaging data augmentation can be viewed at https://gitlab.com/eburling/shift.

The IF images were contrast enhanced by saturating the top 1% and bottom 1% of pixel intensities. Other images were processed as described in the image pre-processing section above. To compare real and virtual IF images, their structural similarity was measured (Zhou Wang et al. IEEE TRANS IMAGE PROCESS. 13, 2004) using the compare_ssim function implemented in the Python library scikit-learn (Pedregosa et al, J. MACH. LEARN. RES. 12, 2011). The SSIM between 11-pixel windows of the real and virtual IF image tiles was calculated. The SSIM between real and virtual IF mages was defined as the SSIM averaged over their windows. Based on observations that SSIM is sensitive to simulations of technical noise which are difficult for models to infer, Gaussian filtering was applied to real and virtual IF images tiles before calculating SSIM using the gaussian function implemented in the Python library scikit-image with sigma set to 3. The Pearson's correlation coefficient was also measured between images using the pearson_r function implemented in the Python library SciPy (Jones et al., SCIPY: OPEN SOURCE SCIENTIFIC TOOLS FOR PYTHON, 2001).

Figure 9:
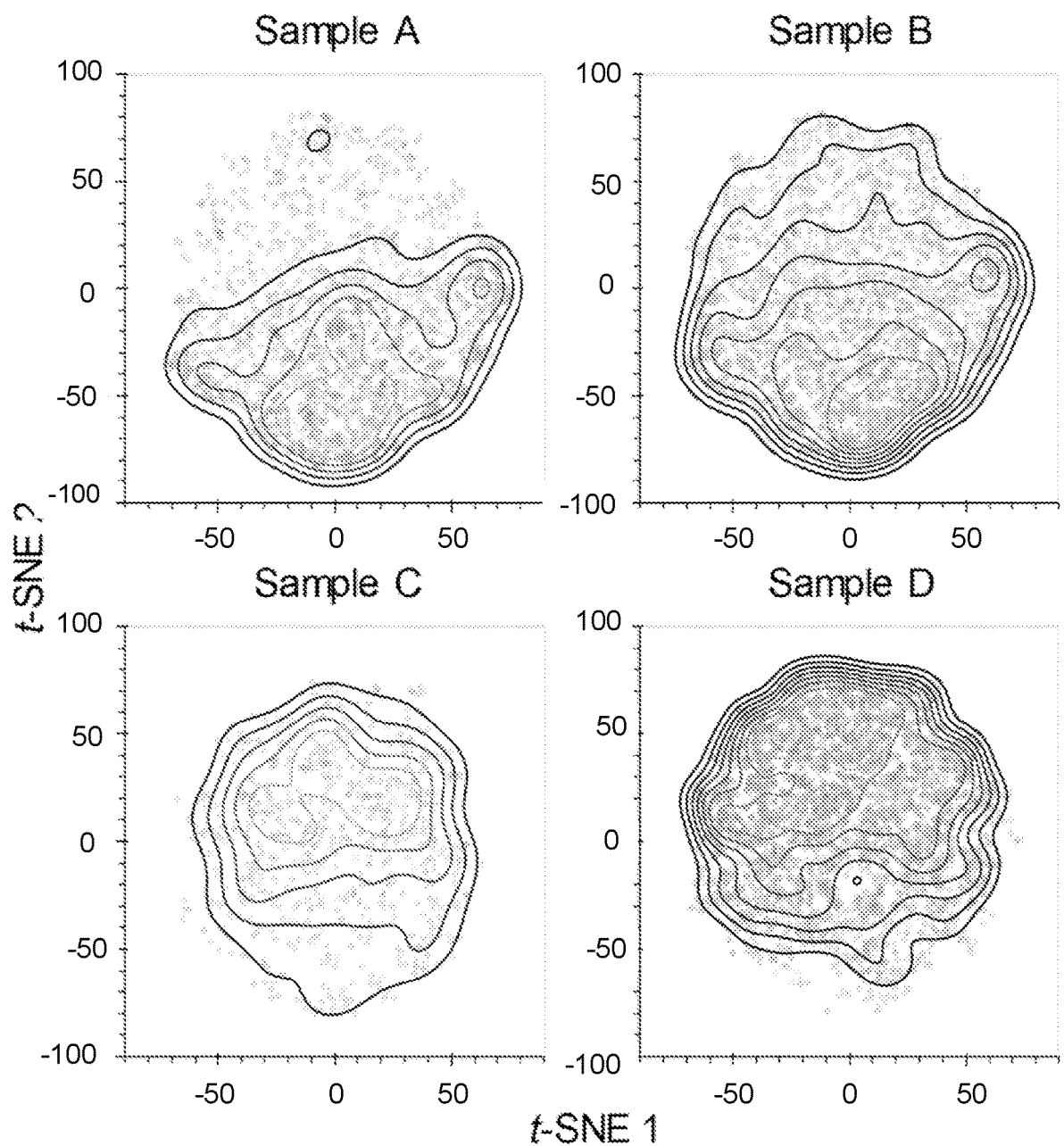
FIG. 9 illustrates t-SNE embedding of feature representations of sample H&E tiles obtained from four samples in Example 2, faceted by sample identity. Each point in each plot represents a single H&E tile and contour lines indicate point density.
Figure 10:
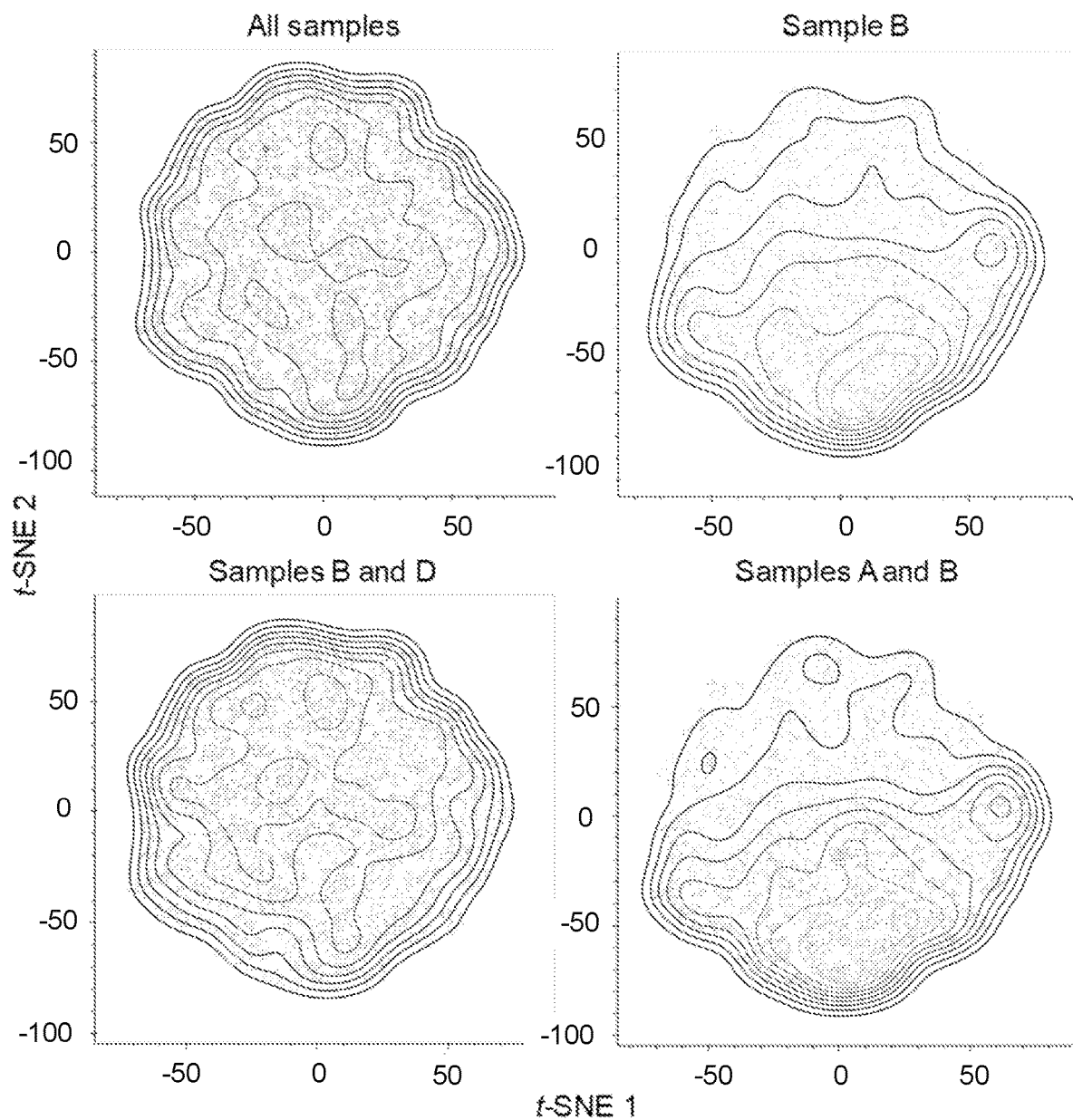
FIG. 10 illustrates H&E tile feature distributions of experiment sample combinations of four samples in Example 2.

RESULTS AND DISCUSSION. FIGS. 9 and 10 illustrate t-SNE embedding of feature representations of H&E tiles obtained from Samples A through D. FIG. 9 illustrates t-SNE embedding of feature representations of sample H&E tiles obtained from each one of Samples A through D. FIG. 10 illustrates t-SNE embedding of H&E tile feature distributions of experiment sample obtained from combinations of Samples A through D. As illustrated in FIG. 10, the feature representations of the H&E tiles from Samples B and D are more representative of the feature representations of all samples than Sample B alone or Samples A and B. Accordingly, the VAE-based sample selection indicated that IF images obtained from Samples B and D would more accurately train the SHIFT model than IF images obtained from Sample B alone, or obtained from Sample A and B.

Figure 11:
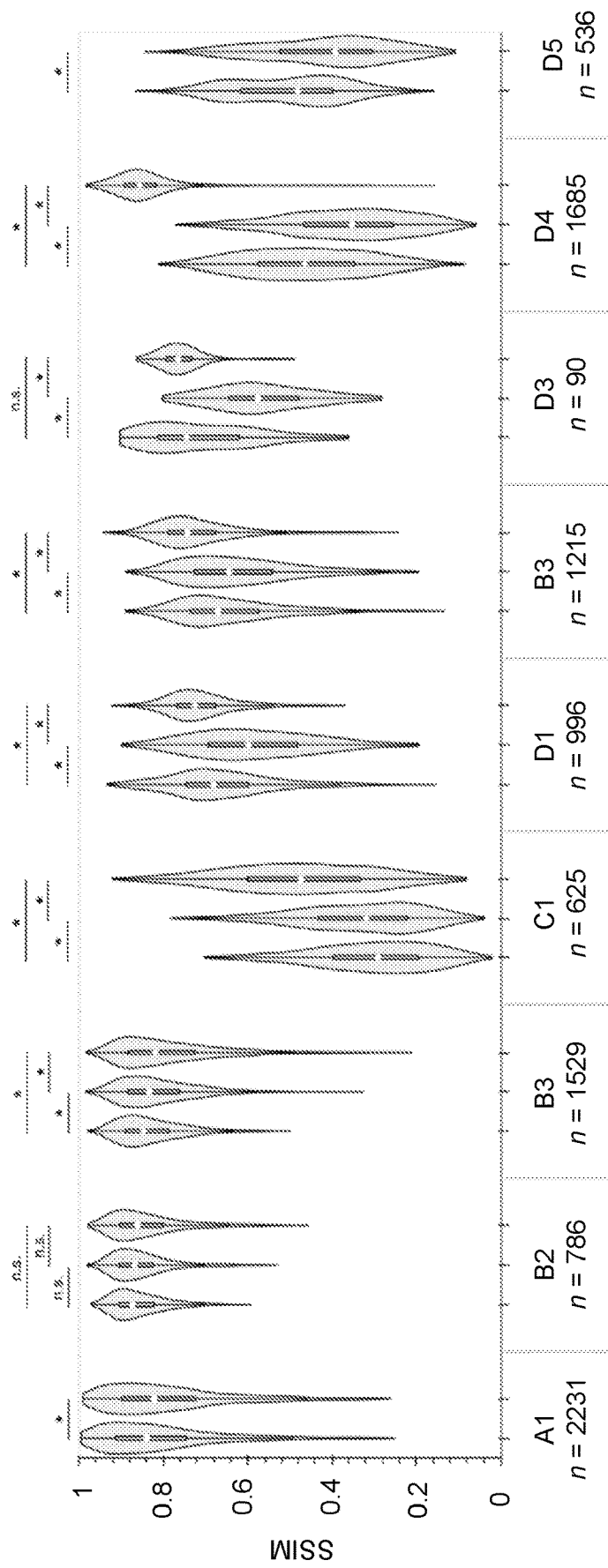
FIG. 11 illustrates SHIFT model prediction performance for optimal and non-optimal training set sample compositions, as expected by the VAE-based sample selection model in Example 2.

FIG. 11 illustrates SHIFT model test performance (SSIM) for optimal and non-optimal training set sample compositions, as predicted by the VAE-based sample selection model. The paired H&E and IF images from samples B and D were subdivided into smaller images B={B1, B2} and D={D1, D2, D3, D4, D5} to avoid regions of IF that exhibited substantial autofluorescence. Each n denotes the number of image tiles that were extracted from that sample. The x-axis labels indicate sample identity, where each letter corresponds to a unique sample and each number corresponds to a subset of that sample. The y-axis represents SSIM between virtual IF images of each sample generated using the SHIFT model and the ground truth IF image of each sample. Plots for sample subsets are were not depicted if that sample subset was a component of a model's training set. *$p<0.05$; for three group comparisons the Friedman test with Nemenyi post-hoc test was used; for two group comparisons the Wilcoxon signed-rank test was used. White dots in violin plots represent distributional medians. For sample identity A1, the left violin plot represents a training set composed of B1, and the right violin plot represents a training set composed of B1+D5. For each one of sample identities B2, B3, C1, D1, D3, and D4, the left violin plot represents a training set composed of B1, the middle violin plot represents a training set composed of B1+A1, and the right violin plot represents a training set composed of B1+D5. For sample identity D5, the right violin plot represents a training set composed of B1, and the left violin plot represents a training set composed of B1+A1. As illustrated, SHIFT models trained using the training set composed of B1 and D5 generally outperformed SHIFT models trained using training sets composed of B1 only or B1 and A1. Accordingly, the VAE-based sample selection methodology described herein is validated.

Figure 12:
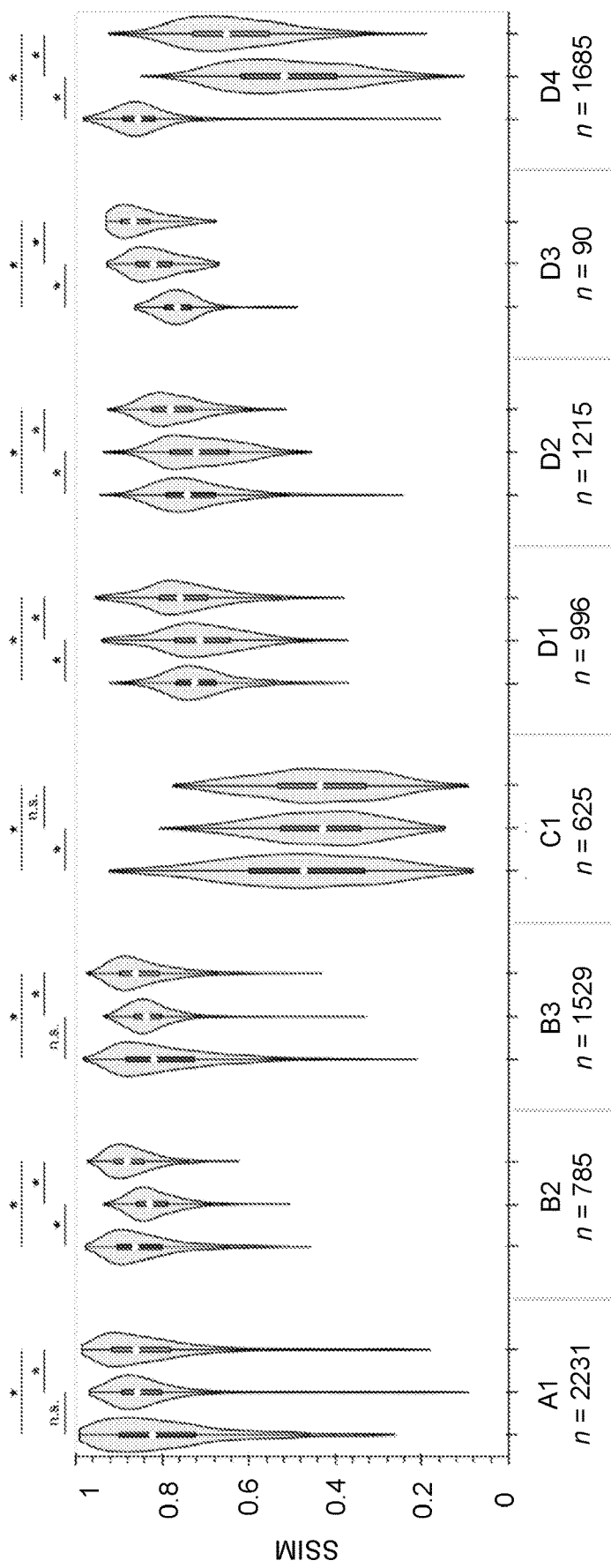
FIG. 12 illustrates prediction performance comparison of models representing different virtual staining methods trained using selected samples in Example 2.

FIG. 12 illustrates test performance comparison of models representing different virtual staining methods trained using B1 and D5. The x-axis labels indicate sample identity, where each letter corresponds to a unique sample and each number corresponds to a subset of that sample. Each n denotes the number of image tiles that were extracted from that sample. The y-axis represents SSIM between virtual IF images of each sample generated using the models and the ground truth IF image of each sample. Plots for sample subsets B1 and D5 are not shown because those sample subsets were components of the models' training sets. *$p<0.05$; Friedman test with Nemenyi post-hoc test. White dots in the violin plots represent distributional medians. For each sample identity, the left violin plot represents the SHIFT model, the middle violin plot represents the f-net (LFD) model, and the right violin plot represents the ensemble model. As illustrated, the SHIFT model generally outperformed the f-net model. In some cases, the ensemble model outperformed the f-net model and the SHIFT model.

Having identified the most representative samples in the dataset using the VAE-based model, Example 2 illustrates whether the SHIFT model could learn a correspondence between H&E and IF images that generalizes across samples. Across all samples in the test set, either SHIFT alone or the ensemble of SHIFT and LFD tended to perform better than LFD alone. Using a limited but heterogeneous dataset, Example 2 demonstrated that SHIFT models are able to generalize across samples drawn from different PDAC patients, even for training sets that are over an order of magnitude smaller than the test set (train n=665 and test n=9693 for models trained on sample subset B1 only). Results from the sampling experiments are consistent with the expectation that an automated and quantitative method for representative sample selection will be critical to the effective development and deployment of DL models on large-scale digital pathology datasets. Finally, the adversarial SHIFT method was compared with an LFD method. It was found that the virtual staining task tends to be best accomplished by the ensemble of both methods. Based on the success of DL-based ensemble methods in other biomedical domains (Codella et al., IBM J. RES. DEV. 61, 2017; Xiao et al., COLD SPRING HARB. PERSPECT. MED. 6, 2018), ensemble methods may become increasingly relevant to the development of virtual staining applications.

Since SHIFT can infer virtual IF images as H&E-stained tissue section are imaged, SHIFT could provide pathologists with near-real-time interpretations based on standard H&E-stained tissue. Therefore, SHIFT could serve as an efficient preliminary, auxiliary, or substitute technology for traditional IF in both research and clinical settings by delivering comparable virtual IF images for a fraction of the cost and in a fraction of the time required by traditional IF or mIF/IHC imaging. As such, SHIFT can be an opportunity to simultaneously economize and democratize advanced imaging technologies in histopathology workflows, with implications for multiplexed virtual imaging. Further, the method of optimal selection of representative histological images described herein, which promotes morphological heterogeneity in the training set, can be a complement to data augmentation, transfer learning, and other means of addressing the problem of limited training data. Moreover, this method can contribute to saving resources and minimizing unnecessary efforts to acquire additional staining or manual annotation for DL applications in biomedical imaging.

The environments and individual elements described herein may of course include many other logical, programmatic, and physical components, of which those shown in the accompanying figures are merely examples that are related to the discussion herein.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

As will be understood by one of ordinary skill in the art, each embodiment disclosed herein can comprise, consist essentially of, or consist of its particular stated element(s), step(s), ingredient(s), and/or component(s). Thus, the terms "include" or "including" should be interpreted to recite: "comprise, consist of, or consist essentially of." The transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; 17% of the stated value; 16% of the stated value; 15% of the stated value; 14% of the stated value; 13% of the stated value; 12% of the stated value; ±11% of the stated value; 10% of the stated value; 9% of the stated value; 8% of the stated value; 7% of the stated value; 6% of the stated value; 5% of the stated value; 4% of the stated value; 3% of the stated value; 2% of the stated value; or +1% of the stated value.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventors expect skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents, printed publications, journal articles and other written text throughout this specification (referenced materials herein). Each of the referenced materials are individually incorporated herein by reference in their entirety for their referenced teaching.

It is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

Explicit definitions and explanations used in the present disclosure are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art, such as the Oxford Dictionary of Biochemistry and Molecular Biology (Ed. Anthony Smith, Oxford University Press, Oxford, 2004).

What is claimed is:

1. A system comprising:
   one or more processors; and
   one or more computer-readable storage media storing instructions that are executable by the one or more processors to perform operations comprising:
      obtaining data of a first image of a sample of biological material that is stained according to a first staining technique, the first staining technique comprising a histological staining technique; and generating, using a model and based on the data of the first image, a second image of the sample of biological material, the second image representing an estimate of the sample of biological material being stained according to a second staining technique, the second staining technique comprising at least one of an immunofluorescence (IF) staining technique, an immunohistochemistry (IHC) staining technique, a multiplexed ion beam (MIBI) technique, or a multiplexed mass cytometry technique.

2. The system of claim 1, wherein obtaining the data of the first image of the sample of the biological material comprises:
identifying first histological images of first samples stained according to the first staining technique, the first staining technique comprising at least one of an H&E staining technique or a DAPI staining,
wherein generating, based on the data of the first image, the second image of the sample of the biological material comprises:
using a variational autoencoder (VAE) to identify feature vectors of the first histological images;
identifying a predetermined number of most representative first histological images based on the feature vectors;
selecting a set of the first samples corresponding to the predetermined number of the most representative first histological images;
obtaining ground truth selective images of the set of the first samples stained according to a second staining technique, the second staining technique comprising at least one of a pan-cytokeratin (pan-CK) staining technique, an α-smooth muscle actin (α-SMA) staining technique, or a Ki-67 staining technique;
training conditional generative adversarial networks (cGANs) based on pairs of the predetermined number of the most representative first histological images and the ground truth selective images, wherein training the cGANs comprises optimizing parameters of convolutional neural networks (CNNs) in the cGANs based on an objective function;
identifying a second histological image of a second sample stained according to a first staining technique, the second sample being omitted from the first samples; and
generating an estimated selective image of the second sample by inputting the second histological image into at least one of the cGANs, wherein the estimated selective image of the second sample is generated without a ground truth selective image of the second sample, and
wherein the operations further comprise:
causing a computing device to output the estimated selective image.

3. The system of claim 2, wherein the cGANs comprise a generator and a discriminator, the generator comprising a first CNN among the CNNs and the discriminator comprising a second CNN among the CNNs, and
wherein the objective function is defined according to a following first formula:

$$G^* = \arg\min_G \max_D \mathcal{L}_{cGAN}(G, D) + \lambda' \mathcal{L}_{L1}(G)$$

wherein G comprises an output of the generator, D comprises an output the discriminator, and λ' is defined according to a following second formula:

$$\lambda' = \lambda \left(\varepsilon + \frac{1}{n}\sum_{i=1}^{n} I_{\Omega(p_i)}\right)^{-1}$$

where ε=0:1, n represents a number of pixels in a ground truth tile of at least one first histological image among the first histological images, and $I_{\Omega(p_i)}$ is defined according to a following third formula:

$$I_{\Omega(p_i)} = \begin{cases} 1, & \text{if } p_i \text{ in } \Omega \\ 0, & \text{otherwise} \end{cases}$$

where Ω represents a ground truth mask, and $p_i$ represents an i-th pixel in the at least one first histological image, the ground truth mask being a binarized mask image of the ground truth tile.

4. The system of claim 2, wherein selecting the set of the first samples comprises selecting a particular sample $X_1$ using a following first formula:

$$\widetilde{x_1} = \min_{X_i \subset X}\left(\frac{|X|}{|X_i|} KL(P(A|X_i)\|P(A|X))\right)$$

and a following second formula:

$$KL(P(A|X_i)\|P(A|X)) = \sum_{f \in F} P(f|X_i) \log \frac{P(f|X_i)}{P(f|X)}$$

wherein X comprises a set of tiles comprised in the first samples, $x_i$ comprises one of the tiles, $X_i$ comprises a subset of the tiles corresponding to an ith first sample among the first samples, F comprises a complete feature set of the VAE, $f_i$ comprises a single feature, A comprises a random variable defined over F, and T comprises a random variable defined over X.

5. The system of claim 1, wherein the model comprises conditional generative adversarial networks (cGANs) that comprise one or more CNNs.

6. The system of claim 5, wherein the operations further comprise:
capturing additional first images of biological material samples that have been stained according to the first staining technique;
capturing additional second images of the biological material samples that have been stained according to the second staining technique; and
producing a training dataset to generate the model, wherein the training dataset comprises the additional first images and the additional second images.

7. The system of claim 6, wherein the additional first images and the additional second images are captured via one or more image capture devices.

8. The system of claim 6, wherein the operations further comprise:
determining correlations between the additional first images and the additional second images; and
generating the model based at least partly on the correlations.

9. The system of claim 1, wherein the first staining technique comprises a hematoxylin and eosin staining (H&E) technique or a 4',6-diamidino-2-phenylindole (DAPI) staining technique, and the second staining technique comprises a pan-cytokeratin (pan-CK) staining technique, an α-smooth muscle actin (α-SMA) staining technique, a DAPI staining technique, or a Ki-67 staining technique, and wherein the first staining technique is different than the second staining technique.

10. The system of claim 1, wherein the second staining technique comprises a selective staining technique targeting one or more biomarkers.

11. A system comprising:
one or more processors; and
one or more computer-readable storage media storing instructions that are executable by the one or more processors to perform operations comprising:
  obtaining data of first images of biological material samples that have been stained according to a first staining technique;
  obtaining second images of the biological material samples that have been stained according to a second staining technique;
  aligning each of the first images with a corresponding second image according to a common coordinate system to produce pairs of aligned images;
  producing a training dataset that comprises the pairs of aligned images;
  determining correlations between features of individual first images and individual second images included in each pair of aligned images included in the pairs of aligned images; and
  generating a model based at least partly on the correlations, the model to generate an image representing a sample of biological material stained according to a staining technique using data of an image of the sample of biological material stained according to an additional staining technique.

12. The system of claim 11, wherein:
the operations further comprise:
  partitioning a first image of a sample of biological material into a plurality of portions, the first image representing the sample of biological material stained according to a hematoxylin and eosin staining technique;
  partitioning a second image of the sample of biological material into the plurality of portions, the second image representing the sample of biological material stained according to a 4',6-diamidino-2-phenylindole (DAPI) staining technique; and
  aligning first nuclei included in a first portion of the plurality of portions of the first image with second nuclei included in an additional first portion of the plurality of portions of the second image; and
  the first image and the second image are a pair of aligned images included in the pairs of aligned images of the training dataset.

13. The system of claim 12, wherein the model is trained using a first number of the plurality of portions and the model is tested using a remainder of the plurality of portions.

14. The system of claim 11, wherein the model is generated using a generator operating in conjunction with a discriminator, the generator to generate images representing biological material stained according to a first staining technique based on data of additional images of the biological material stained according to a second staining technique.

15. The system of claim 14, wherein generating the model comprises:
  the generator generates an image representing a sample of additional biological material stained according to the second staining technique;
  the discriminator generates a numerical score indicating a prediction that the image is representative of the training dataset;
  determining that the image is not included in the training dataset; and
  modifying the model based at least partly on the prediction being in error.

16. The system of claim 15, wherein generating the model comprises:
  the generator generates an image representing a sample of additional biological material stained according to the second staining technique;
  the discriminator generates a numerical score indicating a prediction that the image is included in the training dataset; and
determining that the image is included in the training dataset.

* * * * *